(12) United States Patent
He et al.

(10) Patent No.: US 7,331,269 B2
(45) Date of Patent: Feb. 19, 2008

(54) APPARATUS AND METHOD FOR INTERCONNECTING ITEMS WITH A FLEXIBLE MEMBER

(75) Inventors: Xinhua He, Troy, MI (US); Mansour Ashtiani, Beverly Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 272 days.

(21) Appl. No.: 10/864,283

(22) Filed: Jun. 9, 2004

(65) Prior Publication Data

US 2005/0069703 A1 Mar. 31, 2005

Related U.S. Application Data

(63) Continuation-in-part of application No. 10/143,239, filed on May 10, 2002, now abandoned, said application No. 10/864,283 is a continuation-in-part of application No. 10/153,016, filed on May 21, 2002, now Pat. No. 6,849,016.

(60) Provisional application No. 60/302,397, filed on Jul. 2, 2001, provisional application No. 60/327,447, filed on Oct. 5, 2001.

(51) Int. Cl.
*D04C 1/12* (2006.01)

(52) U.S. Cl. .................. 87/6; 57/210; 57/232

(58) Field of Classification Search ............ 87/6–9
See application file for complete search history.

(56) References Cited

U.S. PATENT DOCUMENTS

| | | | |
|---|---|---|---|
| 538,222 A | 4/1895 | Davids | |
| 2,414,945 A | 1/1947 | Grund | 35/8 |
| 2,592,696 A | 4/1952 | Hoody | 24/129 |
| 3,494,214 A | 2/1970 | Egli | 74/246 |
| 3,777,586 A | 12/1973 | Stirton | 74/231 J |
| 4,031,766 A | 6/1977 | Beck | 74/231 J |
| 4,214,488 A | 7/1980 | Conrad | 474/148 |
| 4,677,818 A | 7/1987 | Honda et al. | 57/224 |
| 4,795,410 A | 1/1989 | Alderfer | 474/256 |
| 5,020,192 A | 6/1991 | Gerlach | 24/136 R |
| 5,083,875 A | 1/1992 | Cedrone | 385/139 |
| 5,322,049 A * | 6/1994 | Dunlap | 124/90 |

(Continued)

OTHER PUBLICATIONS

H. C. Linstid et al.; Liquid Crystal Polymers: An overview of Technology and Typical Applications; NPE 2000; Jun. 20, 2000; pp. 1-49.

(Continued)

*Primary Examiner*—Shaun R. Hurley
(74) *Attorney, Agent, or Firm*—Douglas D. Fekete

(57) ABSTRACT

A flexible member, comprising: an inner core member, comprising a plurality of strands of liquid crystal polymers cooperating with each other to define and provide the inner core member; an outer sheath disposed about the inner core member, the outer sheath defining an inner opening for receiving the inner core member therein, the inner core member being slidably received within the outer sheath, wherein the flexible member is capable of being disposed about a curved surface, wherein a lubricant is disposed upon an exterior surface of the outer sheath and the outer sheath further comprises an end-fitting member disposed about a portion of the flexible connector, the portion of the flexible connector comprising an engagement surface for securement of the end fitting thereto.

17 Claims, 19 Drawing Sheets

U.S. PATENT DOCUMENTS

| | | |
|---|---|---|
| 5,624,752 A | 4/1997 | Hokudoh .................... 428/357 |
| 5,649,414 A | 7/1997 | Rawdon et al. ............... 57/201 |
| 5,836,199 A | 11/1998 | Loud .......................... 72/466 |
| 2003/0005681 A1 | 1/2003 | He et al. ...................... 57/210 |
| 2003/0069099 A1 | 4/2003 | Ashtiani et al. ............ 474/237 |
| 2003/0220165 A1 | 11/2003 | He et al. .................... 474/203 |
| 2005/0011344 A1* | 1/2005 | Hess ............................... 87/5 |

OTHER PUBLICATIONS

Moyer et al.; Comparative Testing of High Strength Cord; 2000 International Technical Rescue Symposium; pp. 1-8.

Yale Cordage; pp. 1-16.

* cited by examiner

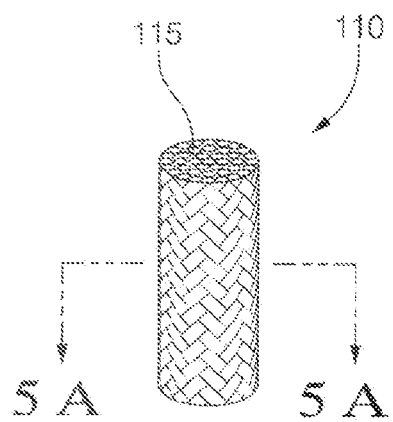
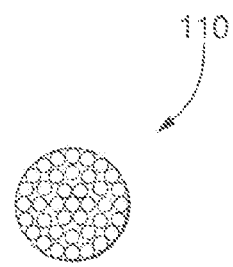
FIG. 5　　　　　FIG. 5A
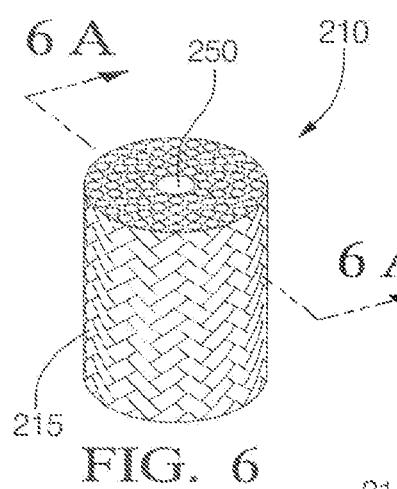
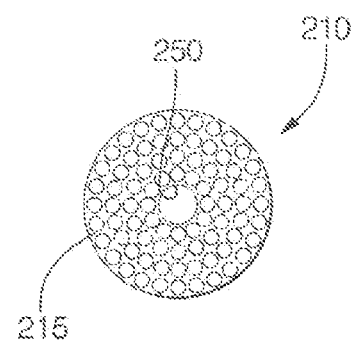
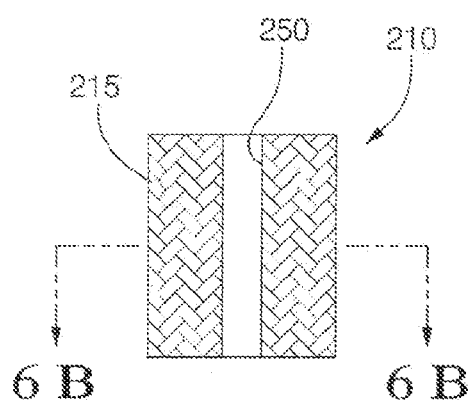
FIG. 6　　FIG. 6B
FIG. 6A

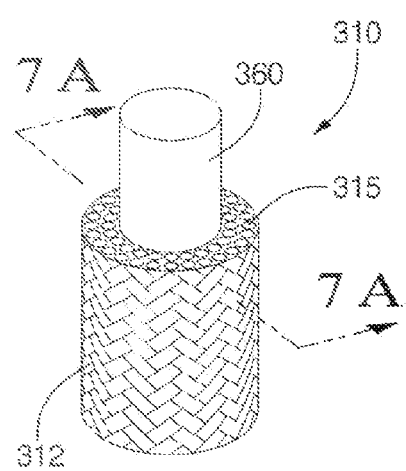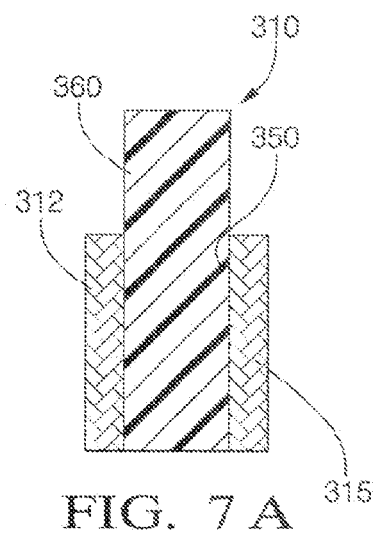
FIG. 7   FIG. 7A
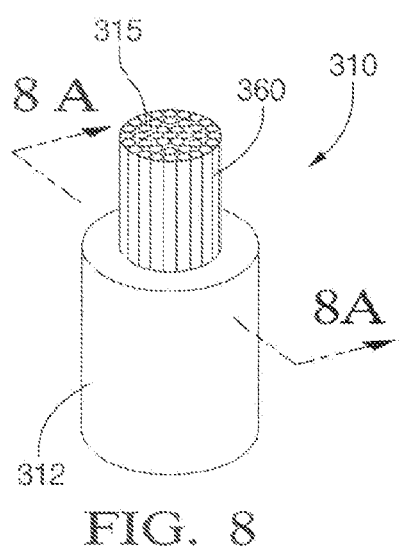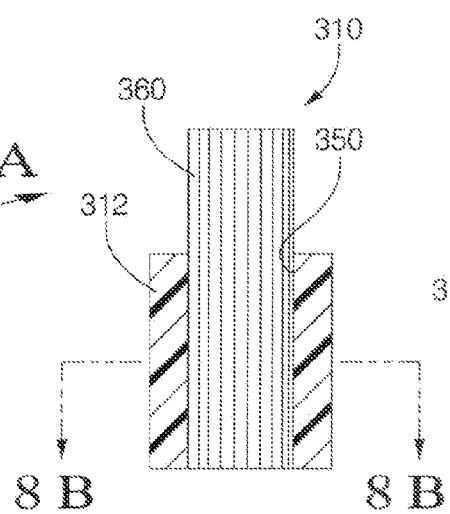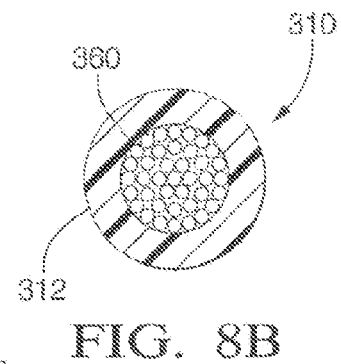
FIG. 8   FIG. 8A   FIG. 8B

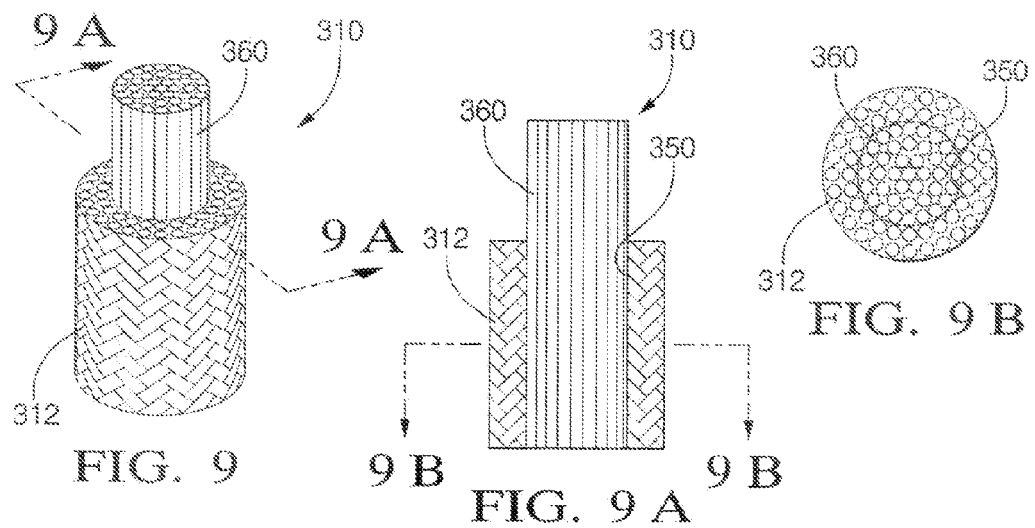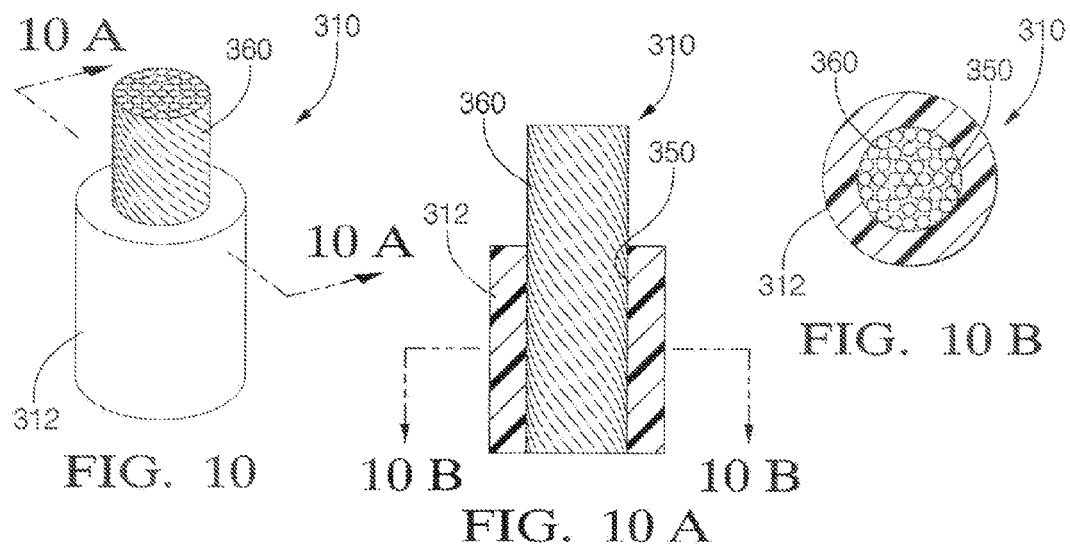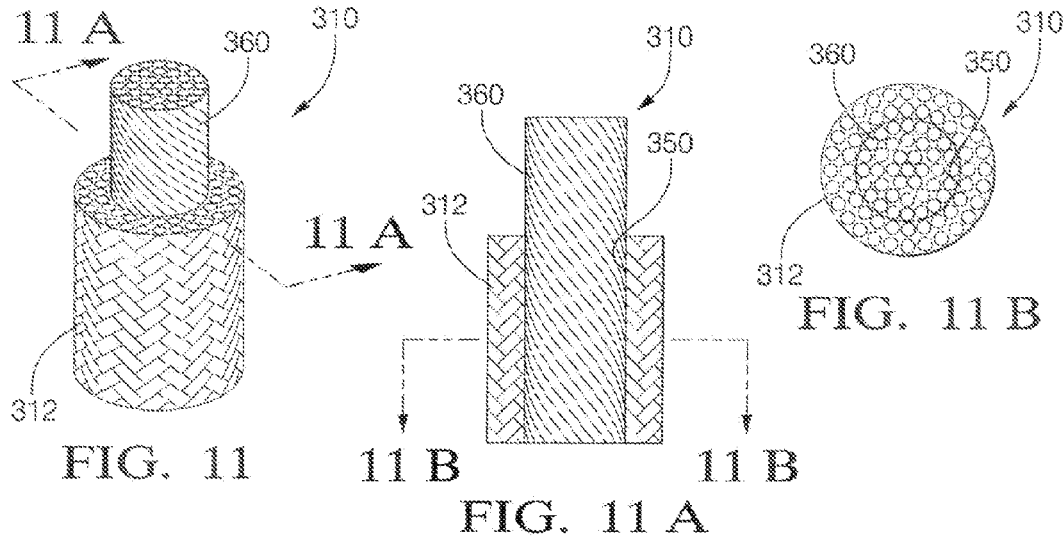

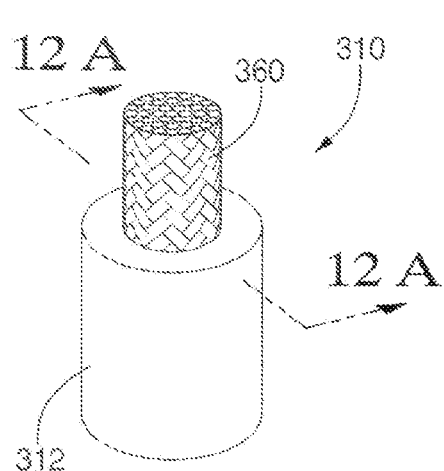
FIG. 12
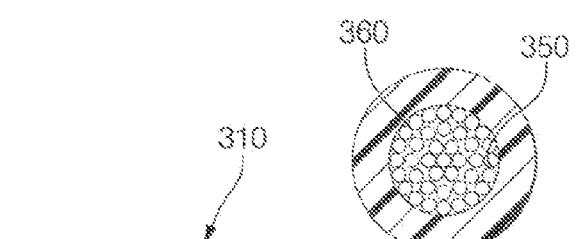
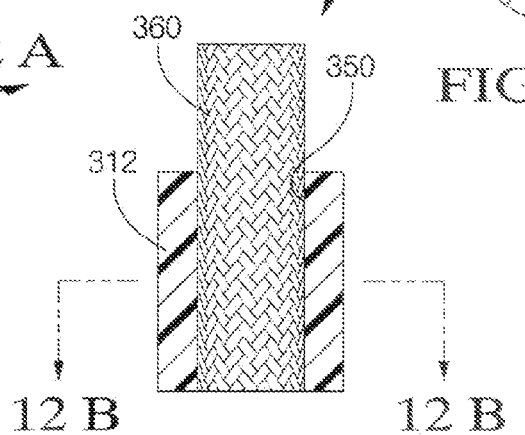
FIG. 12A
FIG. 12B
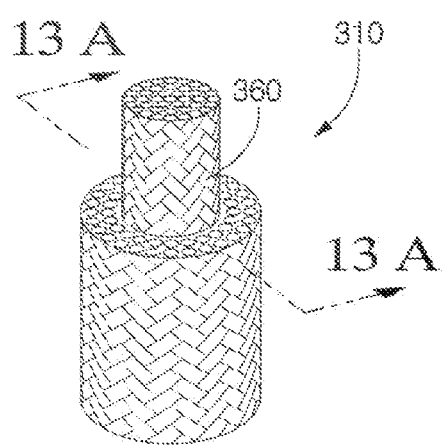
FIG. 13
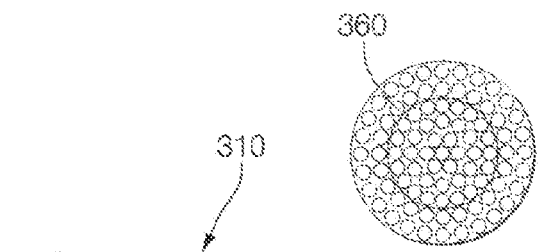
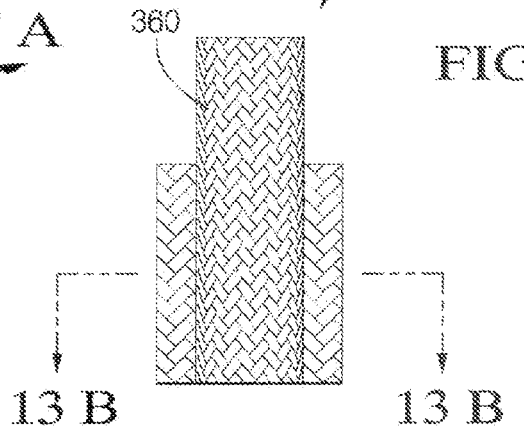
FIG. 13A
FIG. 13B

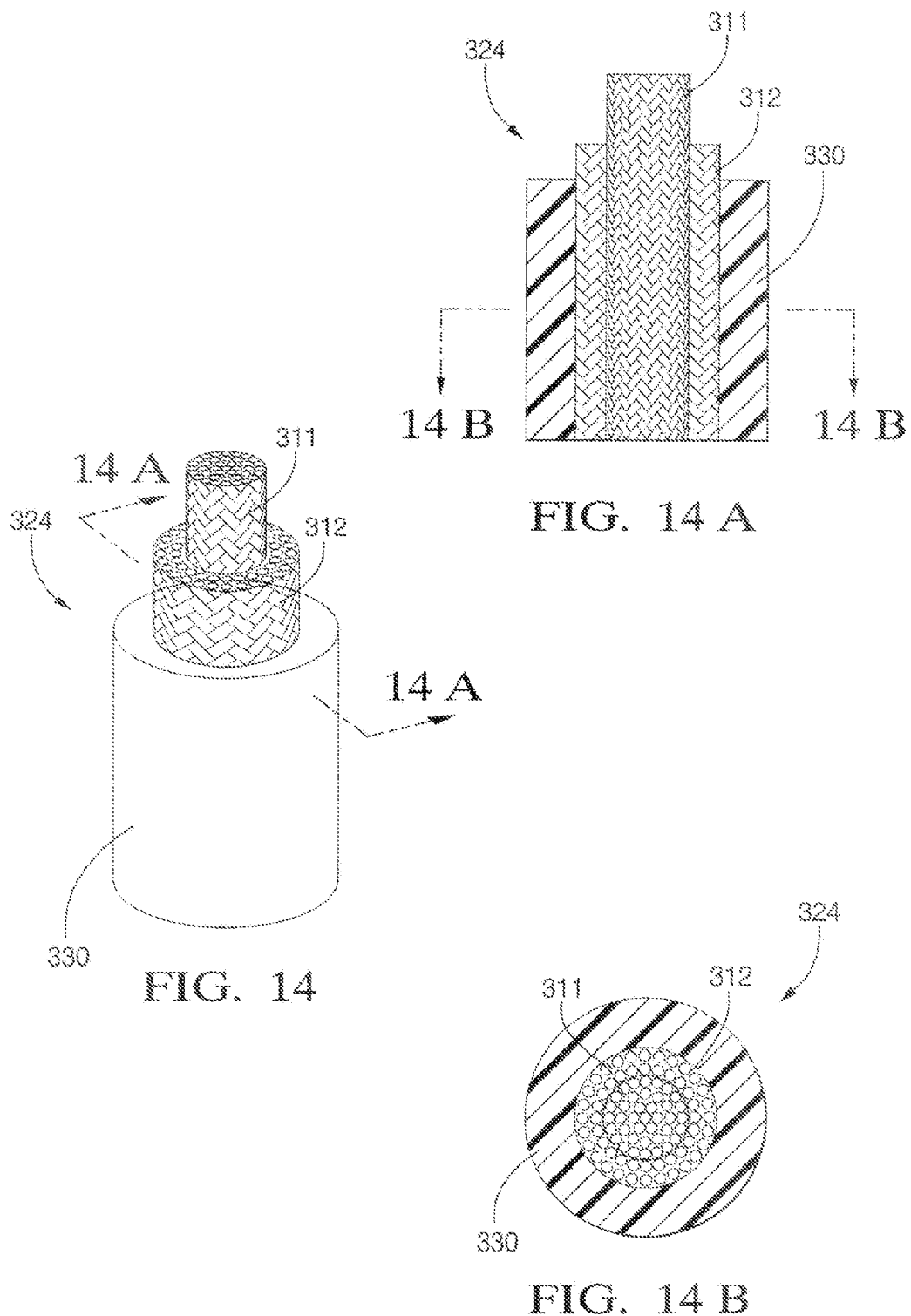

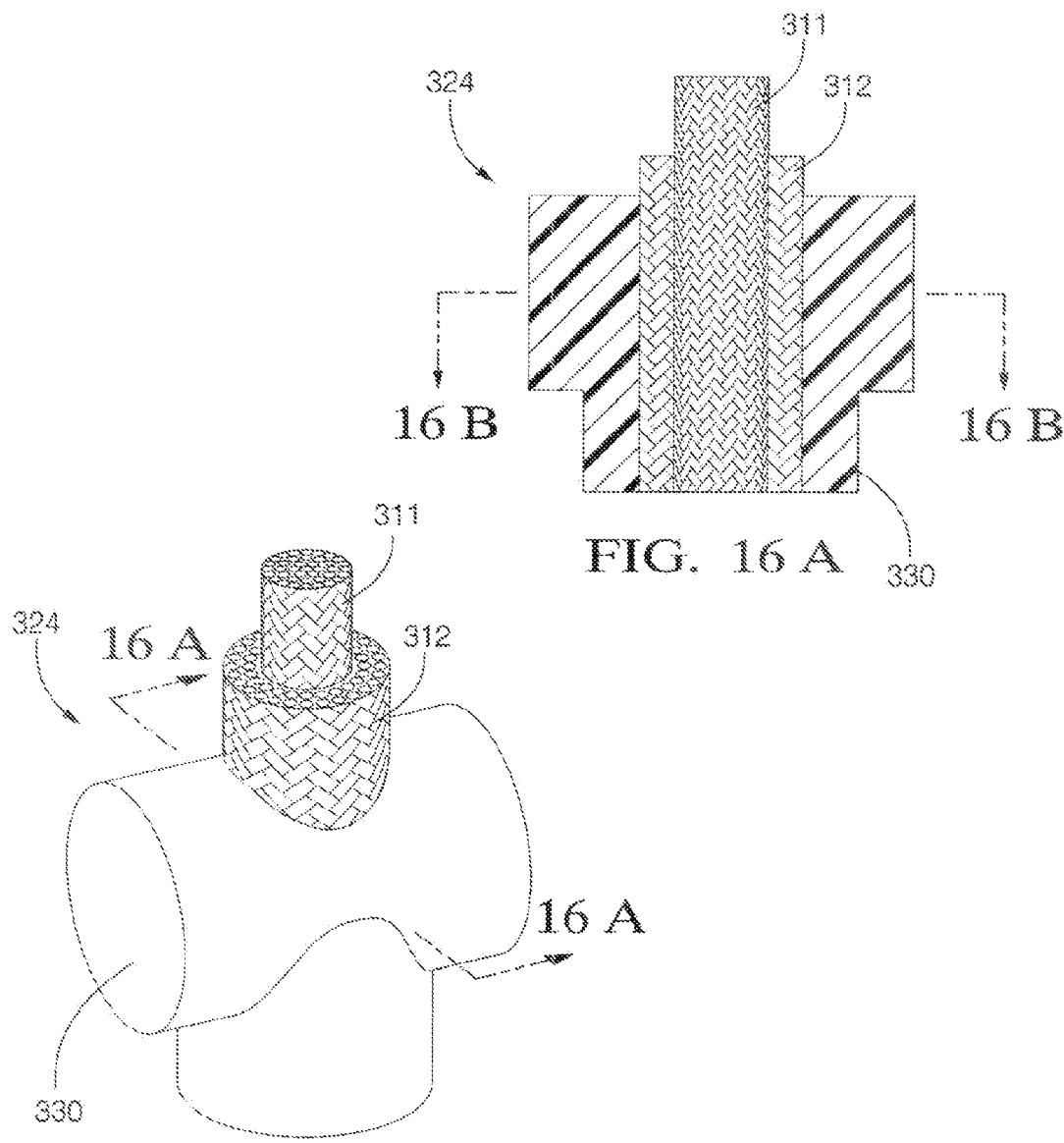
FIG. 16A
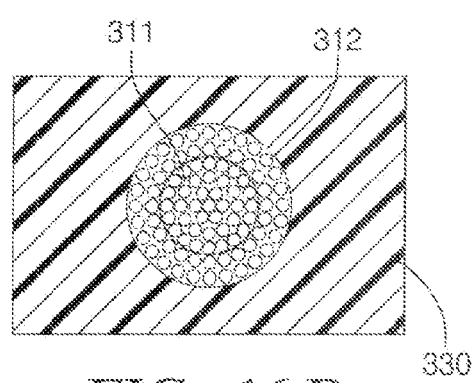
FIG. 16
FIG. 16B

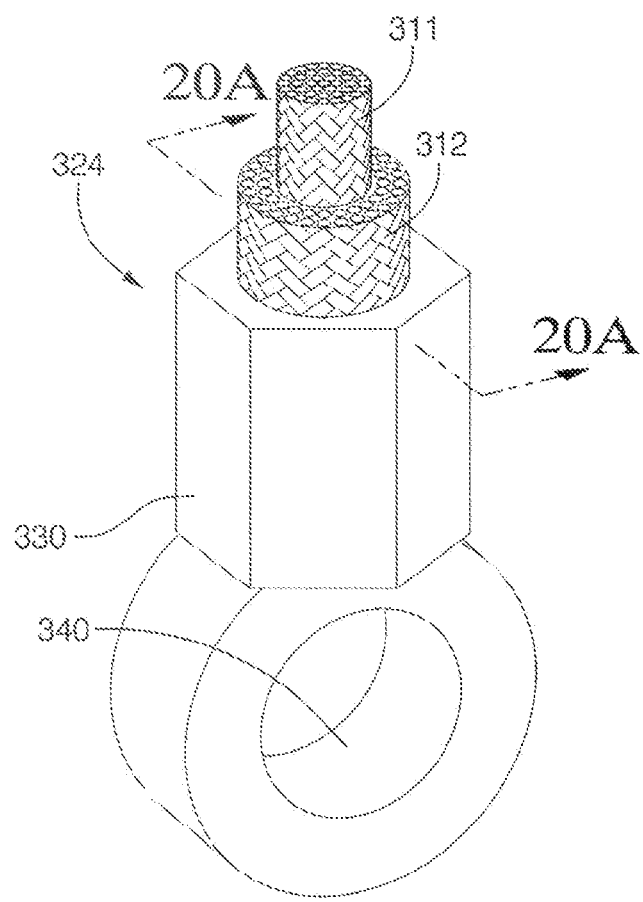 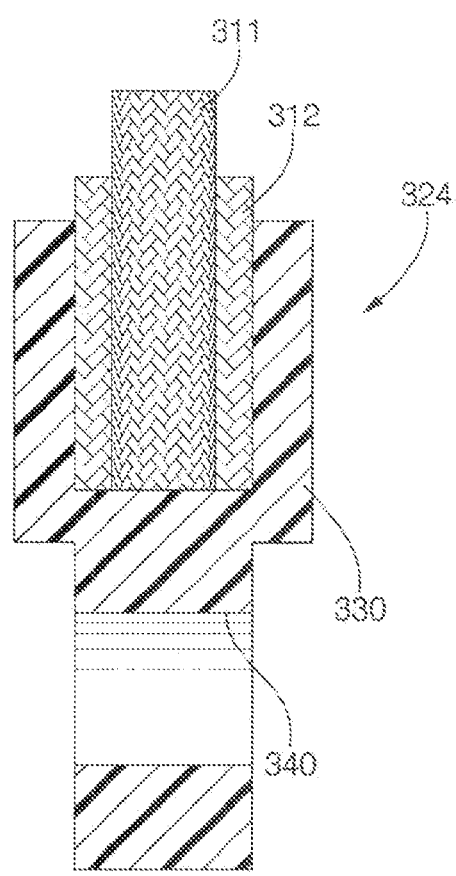
FIG. 20  FIG. 20 A

HOW DO LCP DRIVING LINES (CABLES) PERFORM?

ANALYSIS OF 3.2mm LCP DRIVING LINE PERFORMANCEW

| | ROPE OD (mm) | ROPE AREA (sq cm) | LOAD (N) | LCP LIFE (CYCLE) |
|---|---|---|---|---|
| PREDICTION | 3.20 | 0.0804 | 800 | 174280 |
| TEST DATA (MM-160) | 3.20 | 0.0804 | 1020 | 130548 |
| | 3.20 | 0.0804 | 1100 | 90158 |
| | 3.20 | 0.0804 | 1177 | 78245 |
| | 3.20 | 0.0804 | 1286 | 62262 |

FIG. 24

APPARATUS AND METHOD FOR INTERCONNECTING ITEMS WITH A FLEXIBLE MEMBER

CROSS REFERENCE TO RELATED APPLICATIONS

The present application is a continuation-in-part application of U.S. patent application Ser. No. 10/143,239, filed May 10, 2002, now abandoned, which claims priority from U.S. Provisional Application Ser. No. 60/302,397, filed Jul. 2, 2001, now expired, the contents of which are incorporated herein by reference thereto.

The present application is also a continuation-in-part application of U.S. patent application Ser. No. 10/153,016, filed May 21, 2002, now U.S. Pat No. 6,849,016, which claims priority from U.S. Provisional Application Ser. No. 60/327,447, filed on Oct. 5, 2001, now expired, the contents of which are incorporated herein by reference thereto.

TECHNICAL FIELD

The present invention relates generally to flexible members for interconnecting a driving device and a driven item.

BACKGROUND

Cables and ropes are used in a variety of applications, in one of the most simplistic forms a rope can be used to tie or secure items down, provide a means for an individual to climb or pull an item up an obstacle (e.g., mountain, tree, wall etc.). More complex usages relate to a cable, rope or other item providing a means for allowing a mechanical force to be applied to an item requiring movement, wherein direct connection between the device providing the mechanical force is either not feasible or would adversely impact the actual mechanical force being applied.

As the amount of force applied to the flexible connector, cable, rope etc. increases the tensile strength of the connector must also increase otherwise the connector will snap and the force will not be applied to the item. Furthermore, mechanical devices (e.g., motors, pulleys, drums, gears) are used to increase the force applied and/or allow the driving device and its related components to be located in a compact space. Therefore, as the required load of the flexible connector increases the flexibility, weight and cost of the connector may be adversely impacted (e.g., a higher rated steel cable usually requires more strands thus the cable becomes more costly, less flexible etc.).

Driving cables are often used in many power and manual products for effecting movement of an item. Typically these cables are constructed from a plurality of metal wires with metal end fittings. The metal wires and the metal end fittings are usually constructed of steel or stainless steel. One drawback of these types of cables is that the cable may lack the bending strength and/or flexibility acceptable for use with small pulleys that are used to accommodate smaller packaging requirements. For example, these metal driving cables often create higher bending stress when used at a smaller bending radius. Thus, there exists a need for a driving cable which can perform at lower temperatures and demonstrates acceptable strength and flexibility for use with smaller bending radius.

One example of a usage of a metal driving cable is in vehicular applications wherein the cable is used in a variety of applications to effect movement of sliding doors, lift gates, hoods and trunks, windows and latches. In any of the aforementioned uses the cable may be required to traverse through at least one pulley or a series of pulleys, be secured to a moving item and the item which effects movement of the moving item. Furthermore, the cable may be required to be wound on to and off of a cable drum or spool in order to take up and release slack of the cable. Accordingly, it is desirable to provide a driving cable that provides greater flexibility and bending strength than a typical metal cable. Also, metal cables may produce vibrations and noise when in use, which may be undesirable in some applications. Thus, it is also desirable to provide a driving cable that reduces noise and vibrations often present with metal cables, and the flexibility of and the bending strength of the cable, as compared to steel alternatives, allows the driving system to be simplified and reduced in size, thus increasing performance.

SUMMARY OF THE INVENTION

A flexible member, comprising: an inner core member, comprising a plurality of strands of liquid crystal polymers cooperating with each other to define and provide the inner core member; an outer sheath disposed about the inner core member, the outer sheath defining an inner opening for receiving the inner core member therein, the inner core member being slidably received within the outer sheath, wherein the flexible member is capable of being disposed about a curved surface, wherein a lubricant is disposed upon an exterior surface of the outer sheath and the outer sheath further comprises an end-fitting member disposed about a portion of the flexible member, the portion of the flexible member comprising an engagement surface for securement of the end fitting thereto.

A flexible connector, comprising: a plurality of strands of liquid crystal polymers braided with each other to define the flexible connector, wherein an exterior surface of the flexible connector is coated with a lubricant and a portion of the flexible connector is manipulated into an engagement surface for securement of an end-fitting member thereto.

A flexible connector, comprising: a plurality of strands of liquid crystal polymers cooperating with each other to define and provide the flexible connector; and an inner axial opening disposed along the inner axis of the flexible connector; an inner core member disposed within the inner axial opening, wherein an exterior surface of the flexible connector is coated with a lubricant and a portion of the flexible connector is manipulated into an engagement surface for securement of an end-fitting member thereto.

A flexible connector, comprising: a plurality of uni-directed strands of liquid crystal polymers cooperating with each other to define and provide an inner core member; an outer sheath of extruded material disposed about the inner core member, wherein a lubricant is disposed upon an exterior surface of the outer sheath and the outer sheath further comprises an end-fitting member disposed about a portion of the flexible connector, the portion of the flexible connector comprising an engagement surface for securement of the end fitting thereto.

A flexible connector, comprising: a plurality of twisted strands of liquid crystal polymers cooperating with each other to define and provide an inner core member; an outer sheath of extruded material disposed about the inner core member, wherein a lubricant is disposed upon an exterior surface of the outer sheath and the outer sheath further comprises an end-fitting member disposed about a portion of the flexible connector, the portion of the flexible connector comprising an engagement surface for securement of the end fitting thereto.

A driving system for a sliding door of a vehicle, comprising: a cable winding device for winding and unwinding a pair of flexible connectors secured to a hinge assembly, wherein each flexible connector comprises; a plurality of strands of liquid crystal polymers cooperating with each other to define and provide the flexible connector; and an inner axial opening disposed along the inner axis of the flexible connector, wherein a portion of the inner axial opening makes contact with another portion of the inner axial opening when the flexible member travels along a path defined by a curved surface thereby decreasing an external dimension of the flexible connector and the portion and the another portion no longer make contact with each other when the flexible connector is no longer traveling along the path.

One intended use is to provide a flexible connector for use with a power sliding door system of a vehicle wherein the flexible connector is used to connect a driving device to the vehicle door.

BRIEF DESCRIPTION OF THE DRAWINGS

FIG. 5 is a partial cross-sectional perspective view of another exemplary embodiment of the present invention;

FIG. 5A is a view along lines 5A-5A of FIG. 5;

FIGS. 6A-6C illustrate another exemplary embodiment of the present invention;

FIGS. 7A-13B illustrate other exemplary embodiments of the present invention;

FIGS. 14A-20A illustrate other exemplary embodiments of end fitting configurations for use with exemplary embodiments of the present invention;

FIGS. 24-25 illustrate an example of testing results of an exemplary embodiment of the present invention.

DETAILED DESCRIPTION OF EXEMPLARY EMBODIMENTS

Disclosed herein are flexible members or liquid crystal polymers (LCP) driving lines or cables that are intended for a multitude of uses, wherein the flexible member is used to provide a driving force to a driven member. Exemplary embodiments of flexible members will be referred to herein as plastic cables or plastic flexible members. The terms of "plastic" or "all-plastic" as used herein, when referring to the flexible members, means that the item is comprised substantially of a plastic or polymeric material. However, and in accordance with other exemplary embodiments the item may comprise other materials as long as the flexible member is capable of achieving the desired performance. A non-limiting example of an intended use is a driving member for a power sliding door in a vehicle. The flexible members of exemplary embodiments of the present invention provide alternatives to steel cables, which due to the characteristics of the steel used are not able to bend around pulleys or guiding members having a small radius of curvature while also providing the desired durability (e.g., operational use based upon hours or days of operation or use based upon number of times the cable is manipulated). An example of such a radius of curvature is defined by a radius less than or equal to 25 millimeters, of course, radius greater than or less than the aforementioned values are considered to be within the scope of the present invention. An exemplary range is 20-25 millimeters. In addition, the flexible members or liquid crystal polymer (LCP) driving lines or cables provide a robust connector that is capable of better performance in a wide range of temperatures as well as being able to bend around a pulley of having a smaller diameter than required for a steel cable of a similar tensile strength.

Exemplary embodiments include a flexible connector that is constructed out of extremely flexible materials that in itself provide a surface that provides a low coefficient of friction with another surface (self lubricating) or has a lubricating material such as graphite or TEFLON applied thereto, which again provides a surface that will provide a low coefficient of friction with respect to another surface. The LCP flexible connector is very flexible in order to provide engagement surfaces (e.g., knots) for end fittings as well as being capable to be disposed about small turning radius. The flexible connector is high strength and has a very low creep (e.g., extension due to stretching which may be applicable to period of use, amount of force applied and temperature conditions). Thus, the flexible connector has a very long life expectancy, as it does not fatigue very quickly.

Figure 1:
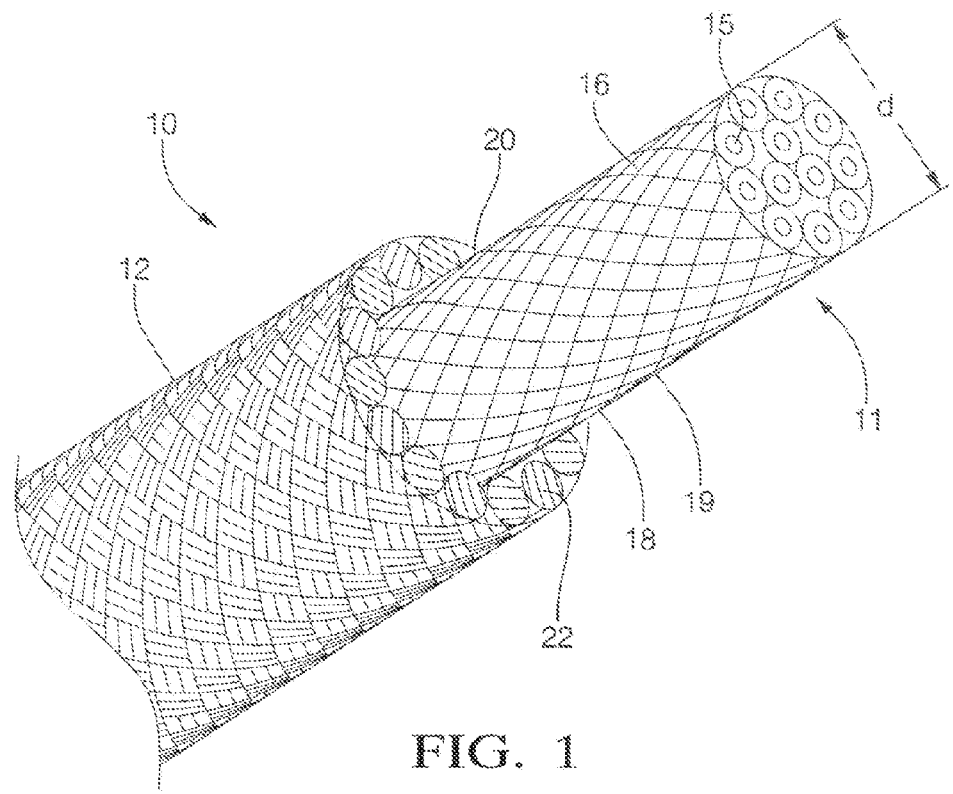
FIG. 1 is a partial cross-sectional perspective view of a flexible connector or cable constructed in accordance with an exemplary embodiment of the present invention.

Turning now to FIG. 1, there is shown a partial cross-sectional perspective view of a flexible connector or cable 10 constructed in accordance with an exemplary embodiment of the present invention. Flexible connector 10 may be constructed in accordance with the teachings of U.S. Patent Application Publication No. 2003/0005681 (corresponding to application Ser. No. 10/143,239); U.S. Pat. No. 7,294,078 (corresponding to application Ser. No. 10/447,027); and U.S. Pat. No. 6,849,016 (corresponding to application Ser. No. 10/153,016) the contents of which are incorporated herein by reference thereto. As illustrated in FIG. 1, flexible connector 10 comprises an inner core member 11 and an outer jacket or sheath 12.

In accordance with an exemplary embodiment inner core member comprises a plurality of high-performance fibers 15 while outer sheath 12, in one embodiment, comprises plastic materials in order to provide a plastic cable or flexible connector 10. In accordance with an exemplary embodiment the high-performance fibers are high performance polymers, such as, liquid crystal polymers (LCP) sold under the trademarks of VECTRAN (available from Ticona), XYDAR (available from BP Amoco), ZENITE (available from DuPont), THERMX (available from Eastman), SUMIKA-SUPER (available from Sumitomo) and (SIVERAS available from Toray). An LCP is a polymer characterized by a highly ordered fluid state between solid and isotropic or amorphous fluid.

Other alternatives for fibers 15 include but are not limited to the following: polyamide, such as nylon 6 and nylon 66, polyester, polypropylene, and polyethylene. The configuration and material of the fibers 15 can vary so long as the desired strength and flexibility are achieved. In accordance with an exemplary embodiment, the diameter of the fibers is approximately in the range of about 2.0 to about 250.0 microns per filament, preferably in the range of about 5.0 to about 50.0 microns per filament. Of course, it is contemplated that the fibers may have sizes and configurations greater or less than the aforementioned ranges although, if applicable, smaller diameter fibers are preferred for use in the construction of exemplary embodiments of the present invention.

An example of the materials contemplated for manufacturing the plastic ends fittings in exemplary embodiments of the present invention is VECTRA (available from Polyplastics), other high performance polymers for the end fittings include aromatic polyester, aromatic polyamide, high density and ultra-high molecular weight polyethylene.

In one exemplary embodiment the fibers are inter-twined to provide inner core 11. In other alternative exemplary embodiments the fibers are braided, twisted or uni-directed in order to provide inner core 11. The braided fibers are provided by a suitable machine or process known to those skilled in the art that will braid the fibers while the uni-directed fibers are provided by a suitable machine or process also known to those skilled in the art that will provide a plurality of uni-directed fibers and finally, the twisted fibers are provided by a suitable machine or process known to those skilled in the art that will provide twisted fibers for use in exemplary embodiments of the present invention. In accordance with exemplary embodiments the fibers and their configuration provide an inner core member having a bending strength and flexibility suitable for use in high load applications wherein the connector or cable follows a straight or tortuous path. Examples of such a high load application would be a connector for use between a driving device and a driven device, such as power sliding doors (See FIGS. 21-23), as well as other automotive and non-automotive applications. Other non-limiting applications also include power lift gates, window regulators, release cables for trunks and hoods, drive chains for vehicles and other mechanical devices, and just about any application wherein a chain, rope or cable is used.

Generally, an inner core member constructed of uni-directed fibers may be less costly to produce than an inner core member made of braided, twisted or an inter-twined inner core member. The uni-directed inner core member may be applicable for automotive window systems as the flexibility and strength of such an inner core member is suitable for such an application. An all-plastic cable or flexible connector comprising a twisted inner core member may be suitable for a variety of applications depending in part upon the twist angle and frequency of the fibers of the inner core member. As the twist angle and frequency increase, the inner core member is more solid and less flexible than an inner core member with a lower twist angle and less twist frequency. Although such a twisted inner core member may be complex to construct, this inner core configuration may offer a wide range of applications.

Depending, in part, on the particular application of the plastic cable or flexible connector 10, the cable is comprised of only the fibers that are used for inner core member 11 wherein no outer sheath is provided (FIG. 5). In this embodiment exterior surface 16 of the inner core member may be treated with a lubricant layer shown as reference number 18 and/or environmental protection coating 19. In an exemplary embodiment, wherein no outer sheath is provided the exterior surface of the inner core member is coated with a dry lubricant, in order to allow the cable or flexible connector to slide more easily over a mechanism, such as a pulley, in order to decrease the wear on the cable and the mating components during use. Thus, the exterior surface of the connector when applied or is in contact with another surface provides a very low coefficient of friction. It is understood that the cable may be used for mounting between a retracted and unretracted position.

Referring back now to FIG. 1, the inner core member 16 has outer sheath 12 disposed thereabout. In one exemplary embodiment, the interior surface 20 of the outer jacket is preferably in contact with the exterior surface 16 of the inner core member and in another embodiment a lubricant layer 18 and/or environmental protection layer 19 is applied between the exterior surface of the inner core member and the interior surface of the outer sheath. Alternatively, outer sheath 12 is in direct contact with inner core 14.

The outer jacket or sheath, as viewed in FIG. 1 may have multiple configurations. In one embodiment outer sheath 12 is a plurality of braided fibers 22, which may comprise yarn, strands or threadline. In another embodiment, the outer sheath is comprised of a coating layer such as plastic, nylon etc. In another alternative, the outer jacket or sheath is comprised of an elastomer, such as rubber or thermoplastic elastomers, such as thermoplastic olefin and VECTRAN. In yet another alternative, the outer sheath is comprised of any of the materials suitable for the fibers comprising the inner core member. In this embodiment and as with the inner core member, the materials for the outer jacket or sheath are high performance fibers such as liquid crystal polymer VECTRAN fiber, aromatic polyester, aromatic polyamide, high density and ultra-high molecular weight polyethylene for high tensile strength and better flexibility.

An advantage of the embodiments wherein the outer sheath comprises a coating layer of plastic, elastomer, rubber or thermoplastic elastomer etc., wherein no fibers 22 are used for the outer sheath is that the diameter of the cable or flexible connector can be varied to accommodate a variety of desirable dimensions in a precise cost efficient manner without adversely affecting the performance of the cable or flexible connector. For example, the materials that comprise the outer sheath 12 may be less costly than the configuration of high performance polymers that are used to construct the inner core member. Moreover, the outer sheath can be relatively easily applied to make a plastic cable or flexible connector of a precise diameter. Another advantage of an all-plastic cable or flexible connector 10 with an outer jacket or sheath 12 is that the outer sheath is separate from the inner core member wherein the relative movement between the inner core member and the outer sheath will increase the flexibility of cable or flexible connector 10 while the bending stresses upon the cable is decreased thereby increasing the life span of the flexible connector. Coating exterior surface 16 with a dry lubricant eases the movement between the inner core member and the outer sheath.

As with the inner core member, the exterior surface of the outer sheath may also be coated with a lubricant and/or environmental protection coating, which depending upon the application may increase the life span and performance of cable or flexible connector 10. A non-limiting example of the dry lubricant or environmental coating is graphite or TEFLON or any other lubricant has equivalent or similar characteristics. It will be understood that the outer jacket may be coated while the inner core is not coated and vice versa.

Regardless of the particular embodiment of the present invention it is contemplated that the exterior surface of the flexible connector, coated with a lubricant or not will produce a coefficient of friction that is much lower than steel or rope. Thus, the exterior surface of the flexible connector is very slippery. Accordingly and in accordance with an exemplary embodiment, an engagement surface is provided to assist with providing a strong connection between an end fitting disposed over the exterior surface of the flexible connector. Furthermore, and due to the flexible nature of the materials contemplated for the flexible connector in accordance of any of the aforementioned embodiments, provides an item that is easily wrapped around a pulley having a small diameter and the item itself is easily manipulated about itself to provide an engagement surface, such as a knot for providing a surface for interaction with an end-fitting disposed over the flexible connector. This is a feature clearly not available from steel cables.

Figure 2A:
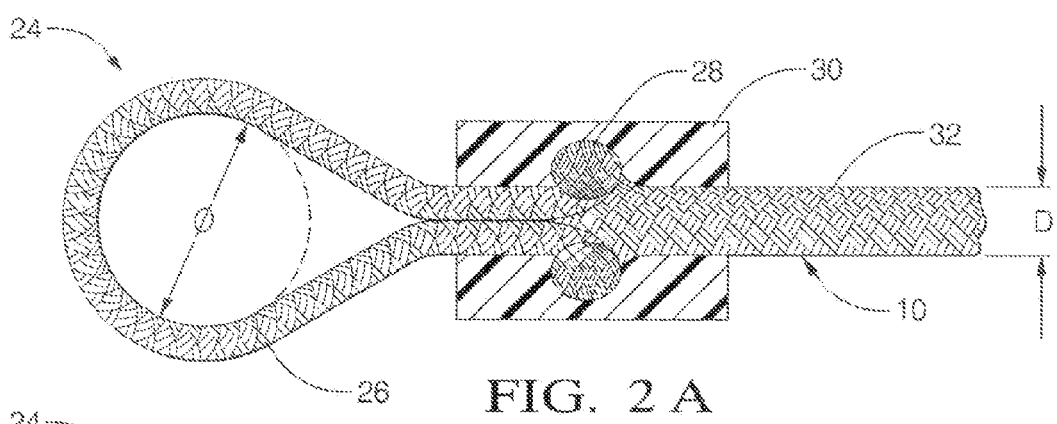
FIGS. 2A-4C illustrates end-fitting configurations for use with flexible connectors or cables constructed in accordance with exemplary embodiments of the present invention.

Referring now to FIG. 2A an end-fitting configuration 24 of cable or flexible connector 10 is illustrated. In this embodiment a loop 26 is defined by a knot 28. As referred to herein knot is intended to mean any manipulation of the flexible connector and/or the outer sheath or any one of, or a plurality of fibers comprising flexible connector 10 and/or the outer sheath. In yet another embodiment, the engagement surface is provided by a bead member, for example those illustrated in U.S. Pat. No. 6,849,016 (corresponding to application Ser. No. 10/153,016) or U.S. Pat. No. 7,294,078 (corresponding to application Ser. No. 10/447,027) the contents of which are incorporated herein by reference thereto. In this embodiment, the end-fitting member would be over molded or positioned over the engagement surfaces provided by the beaded member.

An end-fitting member 30 is then positioned to be secured to the flexible connector proximate to loop 26 by engaging the surfaces provided by knot 28. In an exemplary embodiments end-fitting member 30 is constructed out of molded plastic and may be formed into a variety of shapes, such as oval, cylindrical and square, which may be required by the desired application. A variety of plastics, including polyamides, such as molding nylon 6 and nylon 66, polyester, polypropylene, polyethylene, acrylontrile-butadiene-styrene (ABS), polycarbonate, polyurethane, and liquid crystal polymer, such as VECTRA may be used for end fitting member 30. In one exemplary embodiment, high strength plastics, such as an acrylontrile-butadiene-styrene polycarbonate blend (ABS/PC), and nylon 6 with approximately 10 to 33 weight percent fiberglass are used for end fitting member 30. Of course, higher or lower percentages of fiberglass are considered to be within the scope of the present invention.

As shown in FIG. 2A, the flexible connector of the cable is formed into a spliced eye loop which may be a connecting site for the cable to connect with a driving device or driven member. The knot will be preformed into a variety of shapes capable of providing resistance and thereby increasing the strength of the interconnection of the cable flexible connector since, as discussed above the exterior surface of the cable produces a low coefficient of friction with respect to another material therefore knot 28 provides a means or engagement surface for end fitting member 30, which in one embodiment is over-molded onto the exterior surface of the flexible connector. Furthermore, and as discussed herein the LCP fibers of the flexible connector allows the same to be very flexible thus, the fibers and the connector itself is capable of being manipulated into a knot, which is clearly not attained by steel cables. Thus, the low coefficient of friction created by the exterior surface of the cable requires an engagement surface for the end-fitting and the flexible nature of LCP polymers allows the cable to be manipulated to provide a knot or engaging surface wherein features are provided for securely retaining an end fitting that is over molded onto the exterior surface of the flexible connector.

In one exemplary embodiment the knot is preferably located such that it is disposed within the end fitting with the loop extending outside of the end fitting opposite the remainder of the cable. The loop opening then provides means for securing the flexible connector to a driving device or a driven member. While only one end fitting is shown and described, it will be appreciated that the cable or flexible connector 10 may have a plurality of end fittings.

Figure 2B:
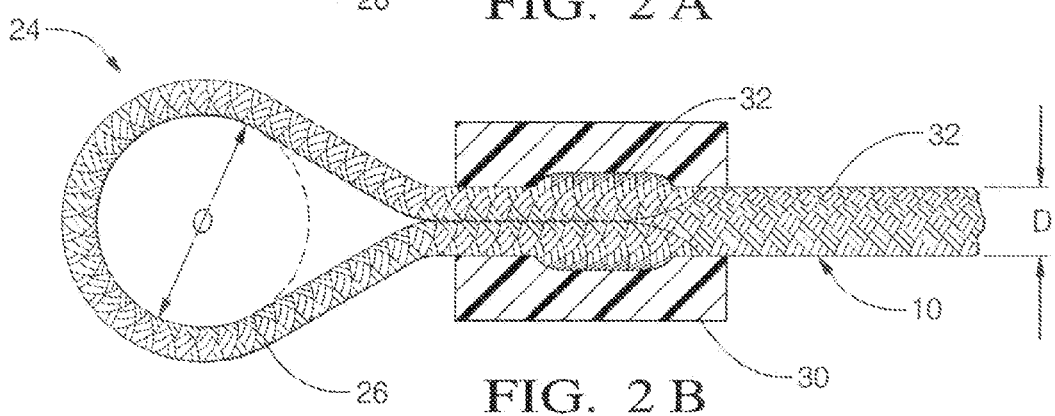
Figure 2:
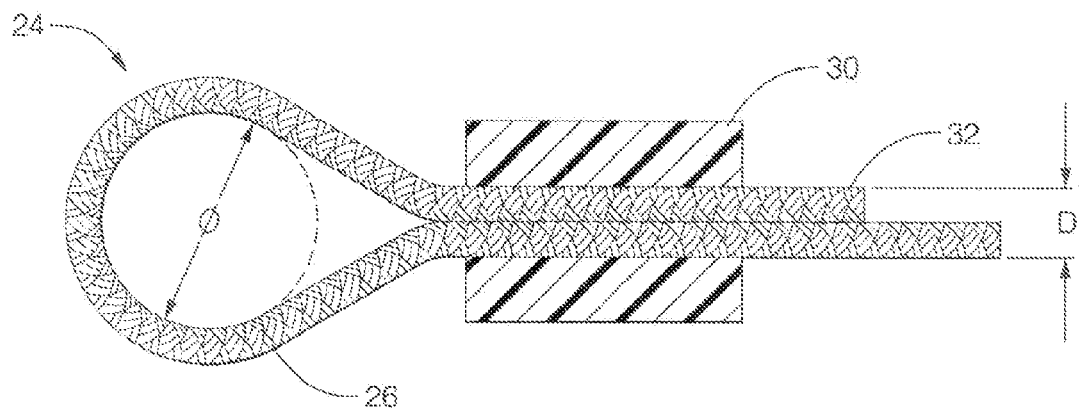

FIG. 2B illustrates another end fitting configuration 24. In this embodiment, the end-fitting configuration is comprised of an end fitting member 30 and a spliced eye loop 26 wherein the cable or flexible connector has a core tail 32 which is formed or cramped within the end-fitting member 30. As discussed herein the LCP fibers of the flexible connector allows the same to be very flexible thus, the fibers and the connector itself is capable of being manipulated into the core tail illustrated, again a feature that is clearly not attained by steel cables. Thus, the low coefficient of friction created by the exterior of the cable requires an engagement surface for the end-fitting and the flexible nature of LCP polymers allows the cable to be manipulated to provide an engaging surface wherein features are provided for securely retaining an end fitting that is over molded onto the exterior surface of the flexible connector. Although not specifically shown it is contemplated that the flexible member is capable of being configured to have multiple knots or engagement surfaces.

Turning to FIG. 2C another end fitting configuration is illustrated. Here the end-fitting member is positioned so that the cable forms a spliced eye loop 26 and the core tail extends outside of the end-fitting member opposite the loop. Extension of the core tail outside of the end fitting member may provide increased strength and versatility of applications for the end fitting member illustrated in FIG. 2C. An alternative of this embodiment is disposing a knot on the portion of the core tail that extends from the end fitting.

Figure 3:
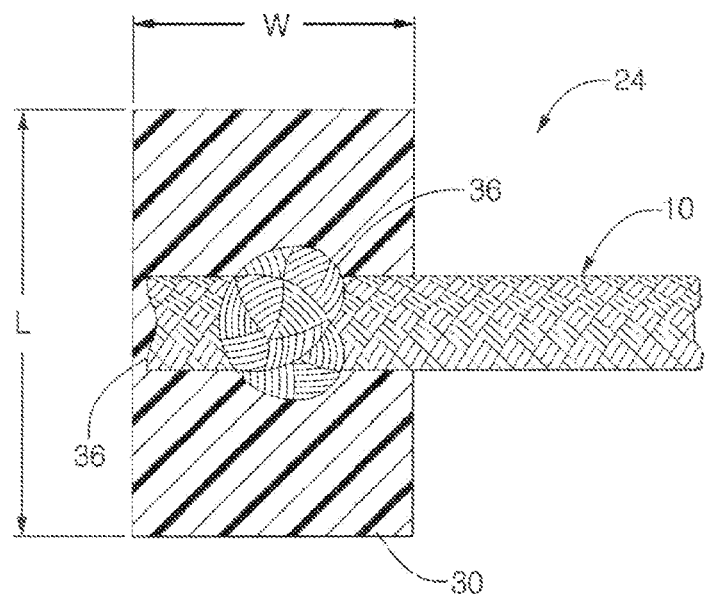
Figure 3B:
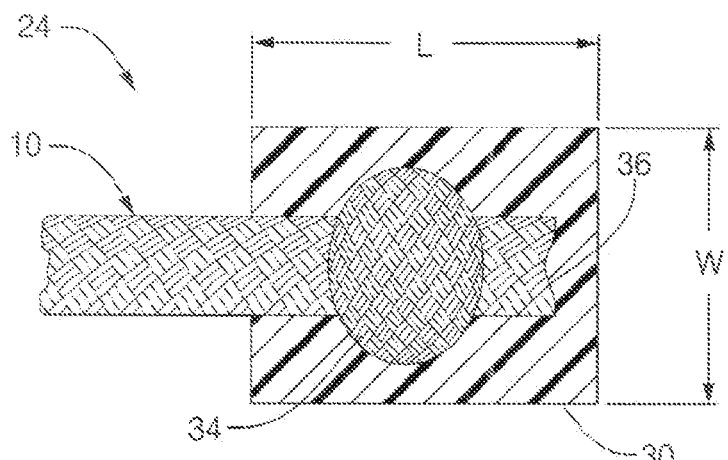

Turning now to FIGS. 3A and 3B another end fitting configuration is illustrated, here a knot 34 is located within an end-fitting member 30 wherein the knot has a core tail 36 extending therefrom. As illustrated, the tail is also encapsulated located within the end-fitting member. As illustrated, the end-fitting member is positioned to have a larger length "L" with respect to another dimension "D" of the end-fitting member 30. In this embodiment the dimension "L" extends away from a surface of the flexible connector or in one embodiment corresponds to a dimension that is perpendicular to a plane or axis that corresponds to the oral length of the cable. FIG. 3B illustrates another alternative exemplary embodiment wherein dimension "L" is greater than dimension "W" and end fitting member 30 is positioned upon the flexible connector such that dimension "L" extends along the same path of the flexible connector or is substantially parallel to a plane corresponding to the length of the flexible connector.

Figure 3C:
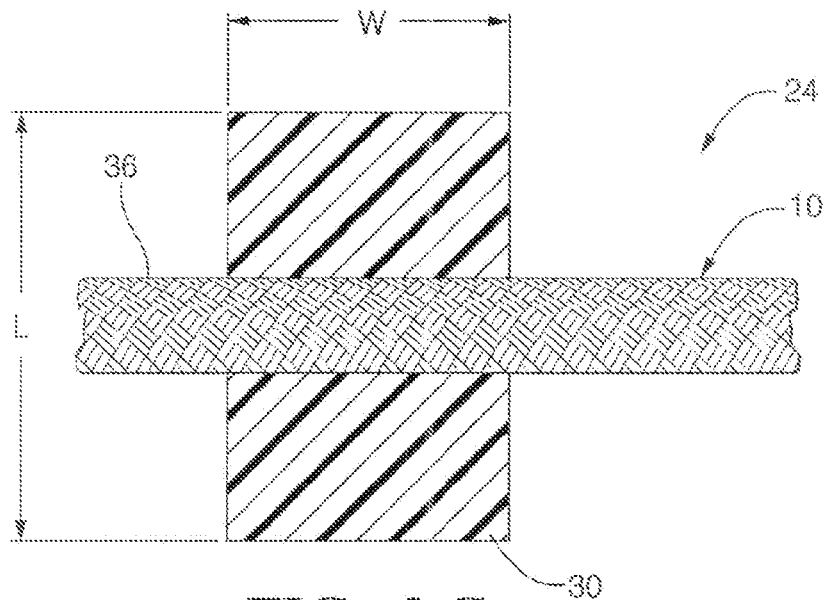
Figure 3D:
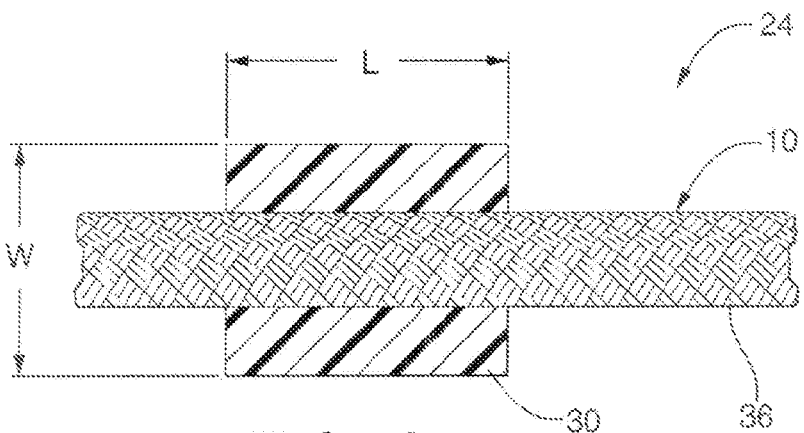

FIG. 3C illustrates another embodiment wherein the end-fitting member is disposed upon the cable or flexible connector such that tail portion 36 extends therefrom. FIG. 3D illustrates an alternative positioning of member 30 on the flexible connector or cable. The length of the tail extending outside or inside of the end fitting may vary depending in part on the requirements of the desired application.

Figure 4A:
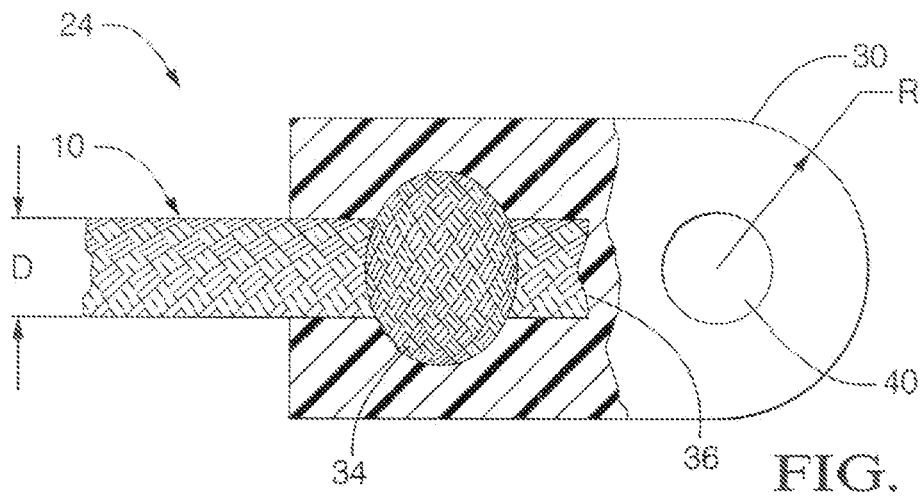
Figure 4B:
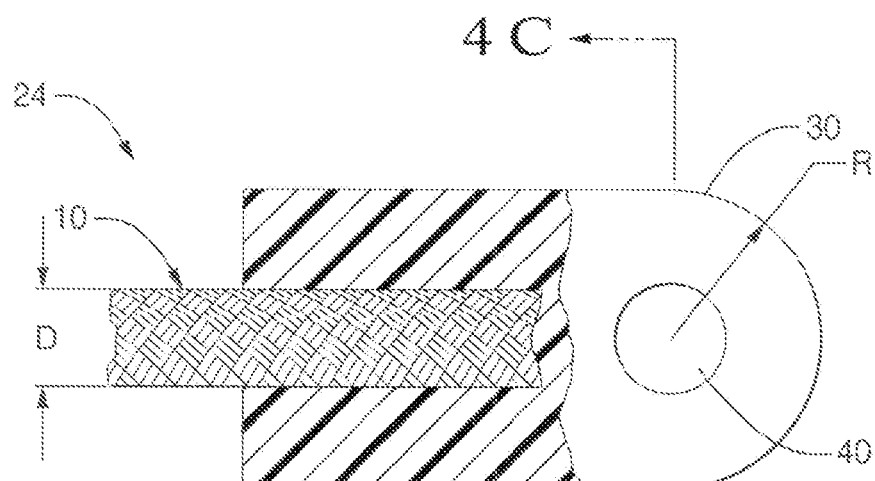
Figure 4C:
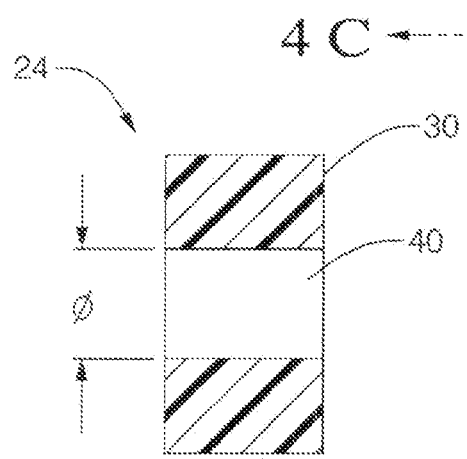

Referring now to FIGS. 4A-4C, yet another end configuration of cable or flexible connector 10 is illustrated. Here the end-fitting member extends past the end or tail of the cable and the portion which extends past the end of the cable comprises an opening 40. Opening 40 is configured to receive a device, such as a pin or shaft. FIG. 4A shows a knot 34 encapsulated within end fitting 30 while FIGS. 4B and 4C illustrate an un-knotted cable portion disposed therein. In FIGS. 3C, 3D and 4B, the exterior sheath of the flexible connector may comprise a roughened surface for providing features for engagement by the end fitting member.

It is also understood that the knot or engagement surface disposed upon the exterior surface of the flexible connector for providing an engagement surface for interaction with the end fitting may also be used with the beaded cables of U.S. Pat. No. 6,849,016 (corresponding to application Ser. No. 10/153,016), or U.S. Pat. No. 7,294,078 (corresponding to application Ser. No. 10/447,027), the contents of which are incorporated herein by reference thereto. In yet another alternative one of the beads of the beaded cables in the aforementioned patent applications may provide the end-fitting itself.

Referring now to FIGS. 5-14B alternative embodiments of cable or flexible connector 10 are illustrated. Here component parts performing similar or analogous functions or features labeled in multiples of 100. Referring in particular to FIGS. 5 and 5A, a cable or flexible connector 110 is illustrated. In this embodiment cable or flexible connector 110 is a solid member comprising a plurality of high performance fibers 115. As discussed above the high performance fibers are in accordance with an exemplary embodiment a liquid crystal polymer (VECTRAN). Other alternatives include but are not limited to the following: aromatic polyester, aromatic polyamide, high density and ultra-high molecular weight polyethylene, polyamides (e.g., nylon 6 and nylon 66), polyester, polypropylene, and polyethylene. In one exemplary embodiment the fibers are intertwined to provide the cable or flexible connector. In other alternative exemplary embodiments the fibers are braided, twisted or uni-directed in order to provide the cable or flexible connector. Depending upon the particular application and in accordance with an exemplary embodiment, the flexible connector or cable 110 may be structured in the range of about 1 to about 20 picks per inch, with a preferred range of about 5.0 to about 15.0 picks per inch. Of course, it is contemplated that the fibers may have sizes and configurations greater or less than the aforementioned values. As with the previous embodiments the exterior surface of the cable or flexible connector may be coated with a lubricant and/or protective material providing a surface that produces a low coefficient of friction with respect to other materials, which lengthens the useful life of the connector as stresses are reduced however, the end fitting will require an engagement surface in order to provide a more robust connection between the exterior surface and the inner surface or diameter of the end fitting.

Referring now to FIGS. 6A-6C, another alternative exemplary embodiment is illustrated. Here cable or flexible connector 210 is configured to have an axially extending passageway 250 within the cable or flexible connector. The diameter and length of the axially extending passageway may vary with the desired application. In the embodiment shown in FIGS. 6A-6C the cable or flexible connector 210 is manufactured from a plurality of high performance fibers 215. As illustrated, the cable or flexible connector is constructed from a plurality of braided fibers 215. Alternatively, the cable or flexible connector is constructed from a plurality of twisted or uni-directed fibers 215, which may be pre-formed or extruded. Since the cable or flexible connector of this embodiment comprises an axially extending opening 250 the cable is able to vary its configuration during use. For example, the cable is able to flatten out from a generally circular configuration to non-circular configuration wherein a dimension of the cable is reduced by one side of axially extending opening 250 compressing against another side of the axially extending opening thereby providing greater flexibility. For example, the cable may flatten out when drawn over a device, such as a pulley, and subsequently return to its original shape after it has passed over the surface of the pulley. As with the previous embodiments the exterior surface of the cable or flexible connector may be coated with a lubricant and/or protective material providing a surface that has a low coefficient of friction with respect to another material or the material of the exterior surface may naturally have such a surface that lengthens the useful life of the connector as stresses are reduced. However, the end fitting will require an engagement surface such as those of FIGS. 2A-4A in order to provide a more robust connection between the exterior surface and the inner surface or diameter of the end fitting.

Referring now to FIG. 7A-13B, other exemplary embodiments of the present invention are illustrated. Here the cable or flexible connector 310 comprises an inner core member 360 that is received within the axially extending opening 350 defined by an outer sheath 312. In the embodiment of FIGS. 7A-7B the pre-formed inner core 360 is formed by injection molding a high performance polymer such as liquid crystal polymer. In this embodiment, the pre-formed inner core member is a solid extrusion while an outer jacket or sheath 312 defines opening 350 and is disposed about member 360. In the embodiment shown in FIGS. 7A-7B the outer sheath is manufactured from a plurality of high performance fibers 315 that are braided together.

Alternatively and referring now to FIGS. 8A-9B, the inner core member is constructed from uni-directed fibers 315, which may be pre-formed or extruded and the outer sheath is manufactured from an extruded outer jacket. Alternatively and referring now to FIGS. 9-9B, the inner core member is constructed from uni-directed fibers 315, which may be pre-formed or extruded and the outer sheath is manufactured from a plurality of high performance fibers 315 that are braided together. FIGS. 10-10B, illustrate an inner core member constructed from a plurality of twisted high performance fibers 315, wherein the twisted fibers have an angle θ with respect to a central axis. Of course, it is understood that angles greater or less than those illustrated may be used in exemplary embodiments of the present invention. As illustrated in FIGS. 10-10B the outer sheath is manufactured from an extruded outer jacket.

Referring now to FIGS. 11-11B, the inner core member is constructed from a plurality of twisted high performance fibers 315 and the outer sheath is manufactured from a plurality of high performance fibers 315 that are braided together. FIGS. 12-12B illustrate a cable or flexible connector 310 wherein the inner core member comprises a plurality of high performance fibers 315 that are braided together while the outer sheath is an extruded outer jacket. FIGS. 13-13B illustrate a cable or flexible connector 310 wherein the inner core member comprises a plurality of high performance fibers 315 that are braided together while the outer sheath is also a plurality of high performance fibers 315 that are braided together.

Referring now to FIGS. 14-20A other exemplary embodiments of end fitting configurations for use with exemplary embodiments of the present invention are illustrated. It is noted that any of the end fitting configurations illustrated herein may be used with any of the configurations and/or embodiments of the flexible connectors or cables of exemplary embodiments of the present invention.

Referring in particular to FIGS. 14-14B an end-fitting member 330 comprised of a plastic or non-plastic material is disposed upon a portion of cable 10, 210 or 310. A second end fitting member, not shown in this view, may be located at another portion or second end of the cable or flexible connector. One contemplated use for the end-fitting member is to provide a means or connection site for connecting the cable with another device at an exterior surface of the end-fitting member. The size, shape and material composition of the end-fitting member will be determined by the desired application of the cable or flexible connector.

Figure 15:
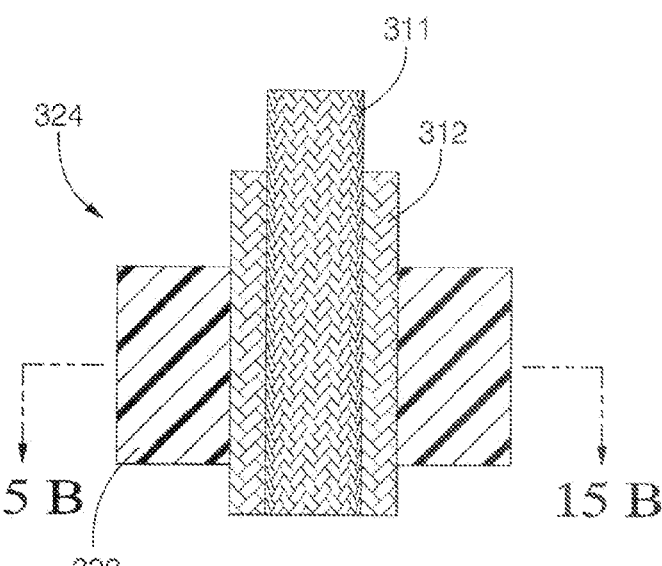
Figure 15:
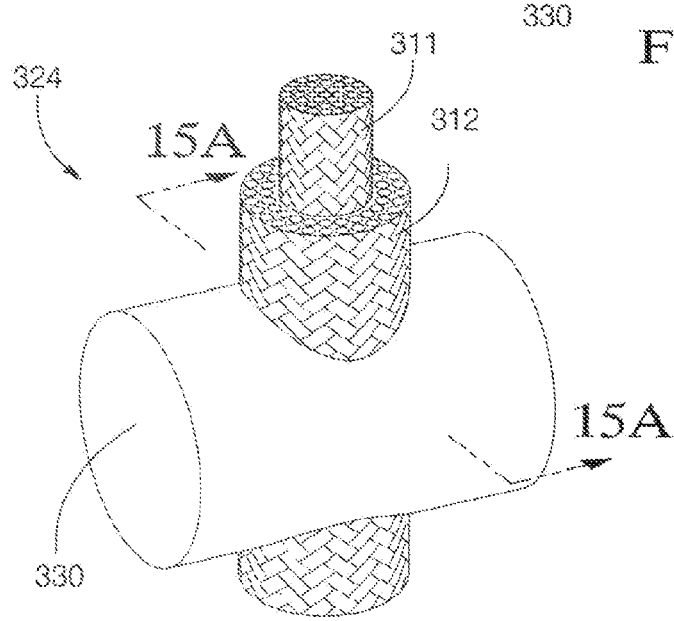
Figure 15:
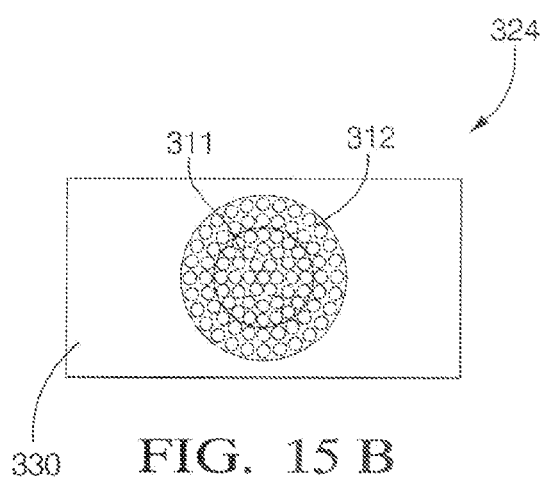
Figure 17:
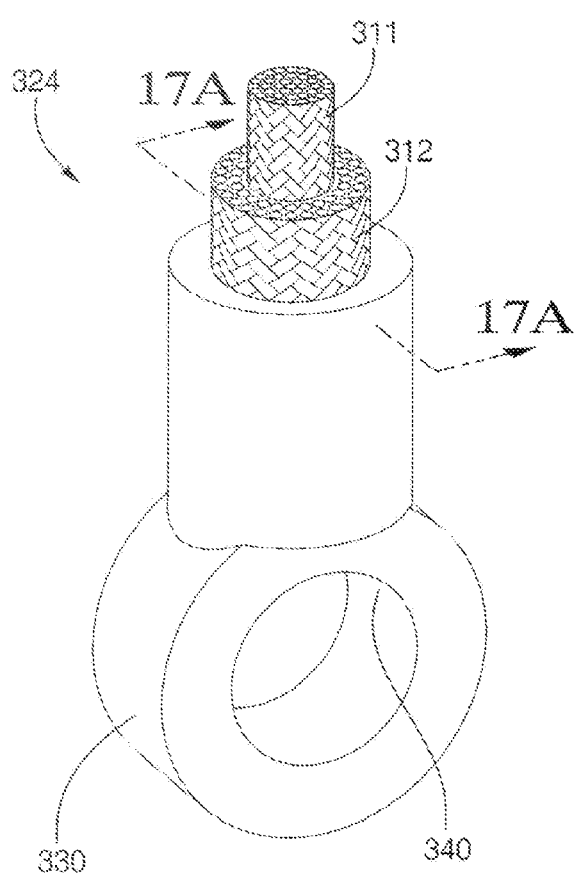
Figure 17A:
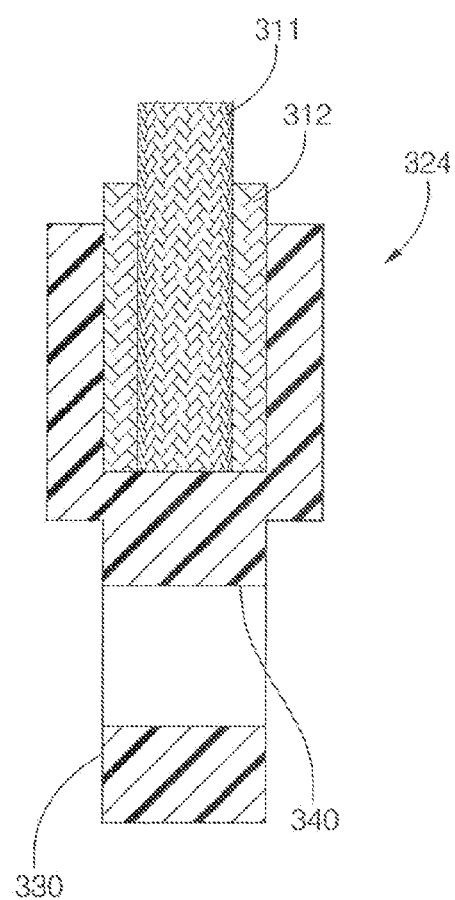
Figure 18:
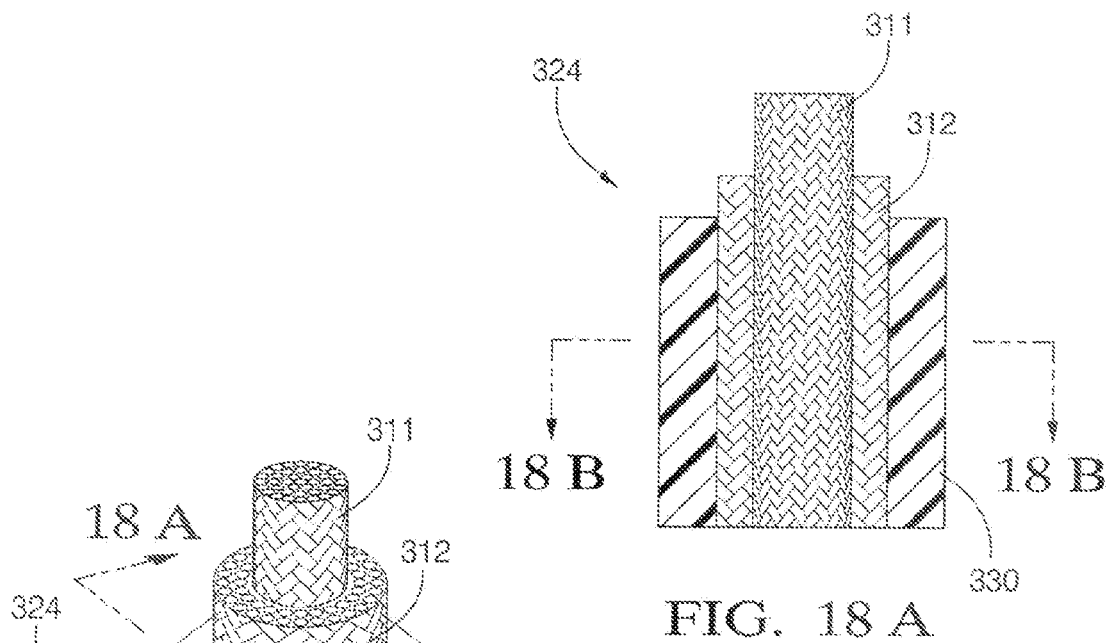
Figure 18:
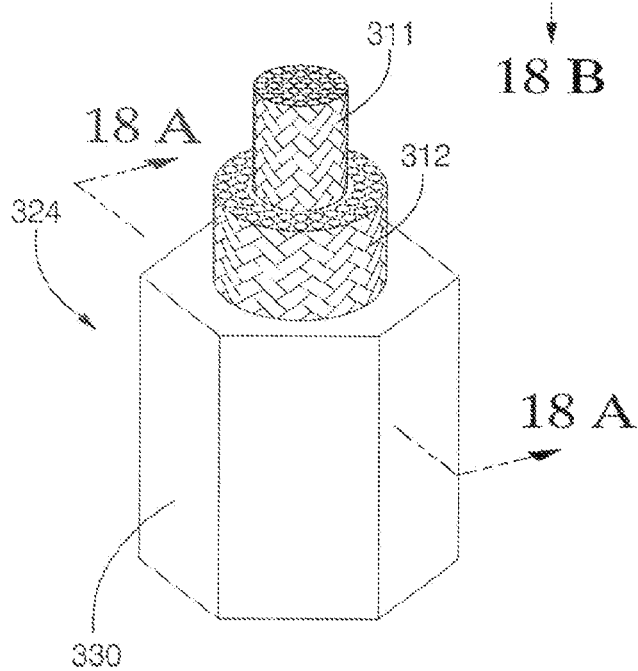
Figure 18:
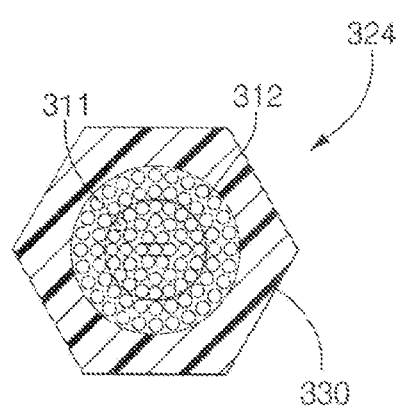
Figure 19:
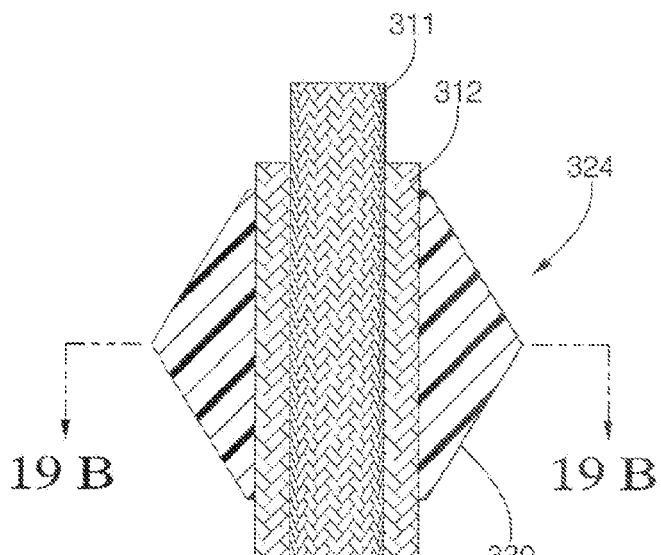
Figure 19:
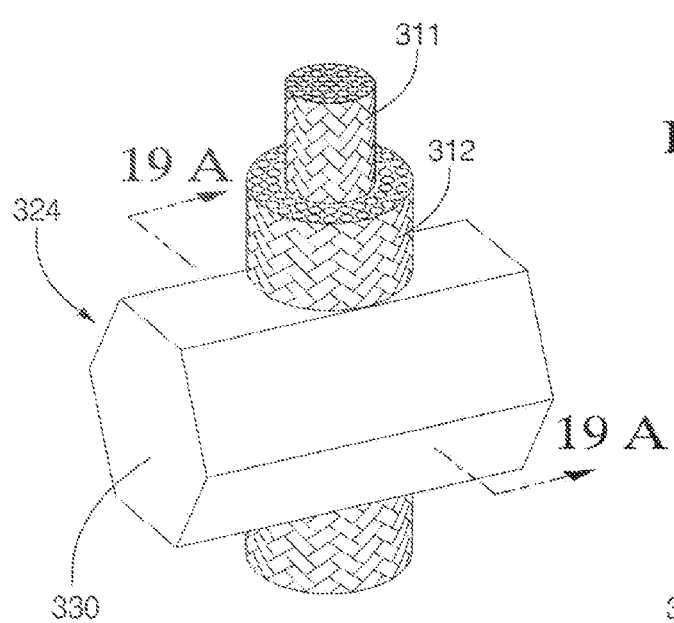
Figure 19:
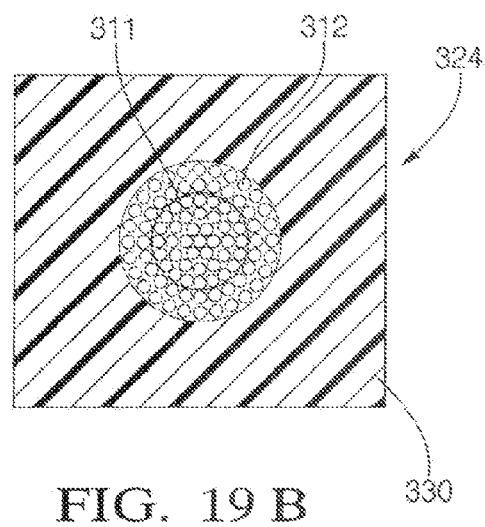

The end-fitting member may be attached to the cable or flexible connector by suitable methods including but not limited to overmolding and clamping. As illustrated in FIGS. 14-14B the end-fitting member is generally circular in configuration. FIGS. 15-15B illustrate an alternative securement of the end-fitting member on the flexible connector or cable. FIGS. 16-20, illustrate other alternative configurations of the end-fitting member. In particular, FIGS. 17-17B and 20-20A illustrate an end-fitting member with an opening 340 disposed therein. Again any of the aforementioned embodiments provide a flexible connector having an exterior surface with a low coefficient of friction with another surface, which lengthens the useful life of the connector as stresses are reduced. However, the end fitting will require an engagement surface (FIGS. 2A-4A) in order to provide a more robust connection between the exterior surface and the inner surface or diameter of the end fitting.

Although not illustrated in each embodiment, it is understood that the ratio of the inner core to the outer sheath or jacket may vary from about 100/0 to about 0/100. The exact ratio and composition of the cable or flexible connector will depend upon the desired application.

Figure 21:
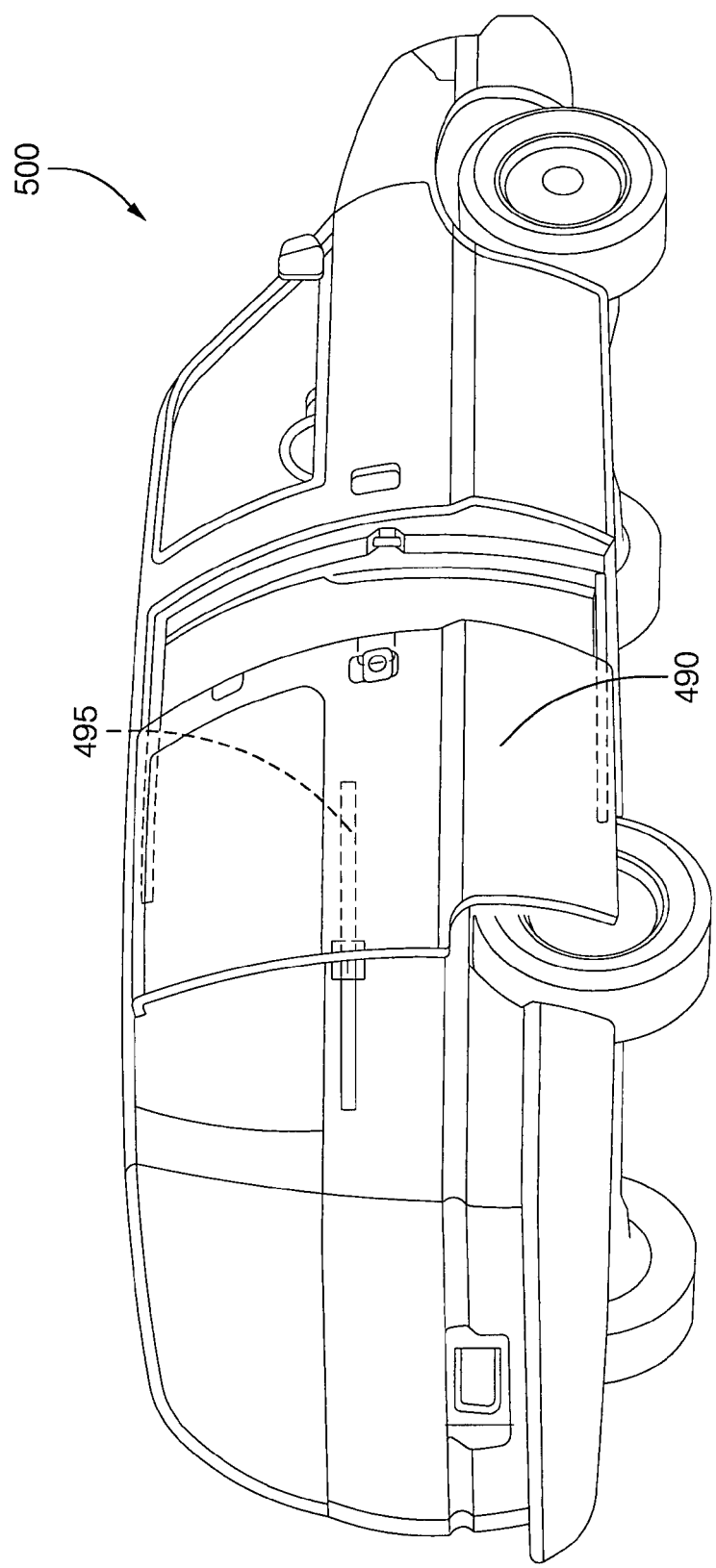
FIGS. 21-23 illustrate a power sliding door and component parts of a driving system for use with exemplary embodiments of the present invention.
Figure 22:
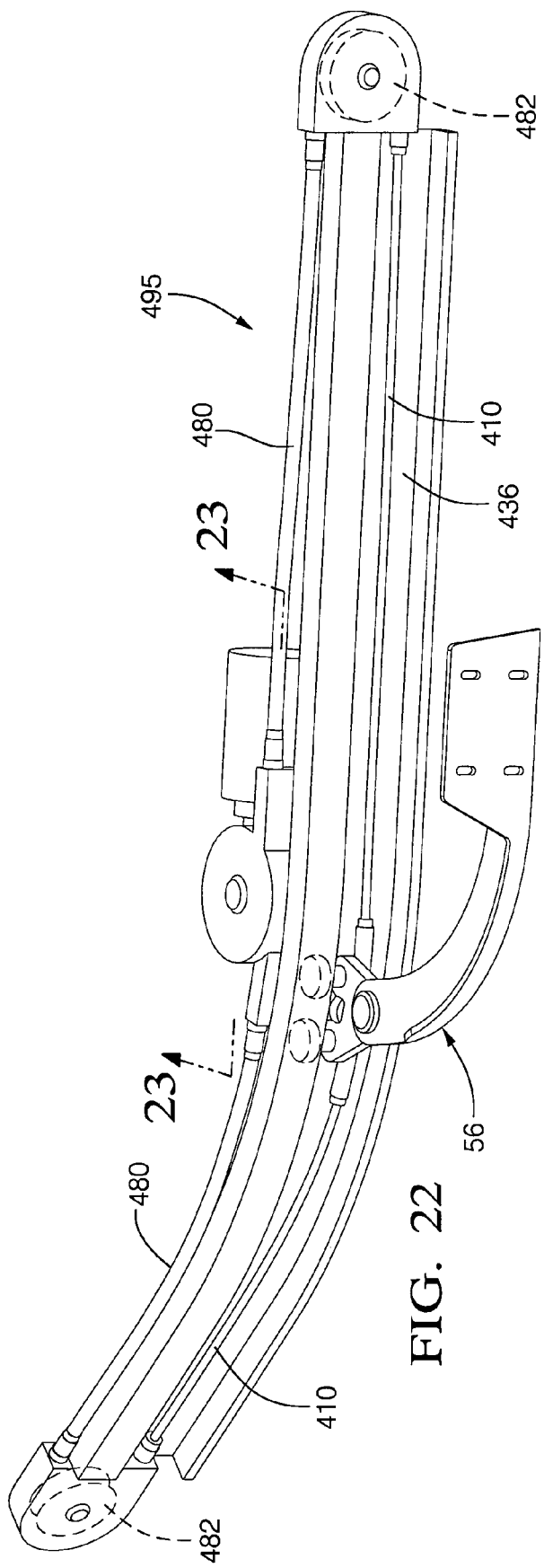
Figure 23:
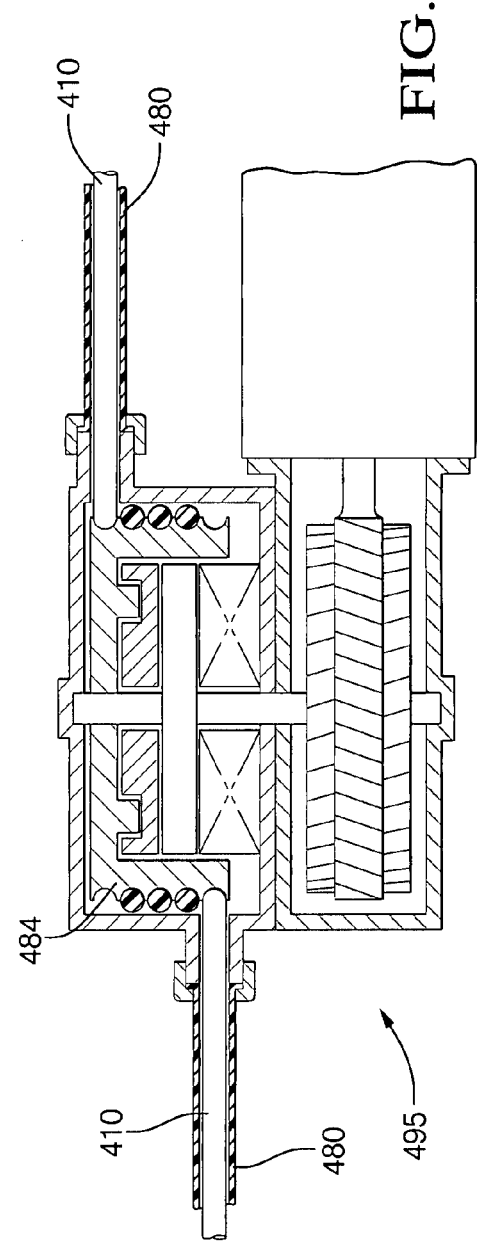

The inclusion and type of mating component depends upon the design and application of the cable or flexible connector. Referring to FIGS. 21-23, a flexible connector 410 in accordance with this invention is employed in a driving system 495 of a power sliding door 490 of a vehicle 500. As shown in the Figs., flexible connector 410 is disposed within a conduit 480 and is connected to a hinge assembly 56 attached to the power sliding door 490. Flexible connector 410 winds about pulleys 482 and is driven by a cable winding drum 484. As illustrated, in exemplary embodiments, an all-plastic cable 410 often will directly contact each of these to function within the driving system 495.

Driving systems which use all-plastic driving cable may have several advantages over driving systems currently using metal wire cables. For instance, the number of components of the system may be reduced if the metal wire cable is replaced with the all-plastic cable. Unlike the metal cable, the inner core of the all-plastic cable is a novel configuration of intertwined or bundled fibers which can work together often providing a cable of increased flexibility and strength or in the case of the embodiment of FIGS. 6A-6C the axially extending opening allows the cable flatten out and bend around smaller radius than other non-plastic configurations.

Figure 25:
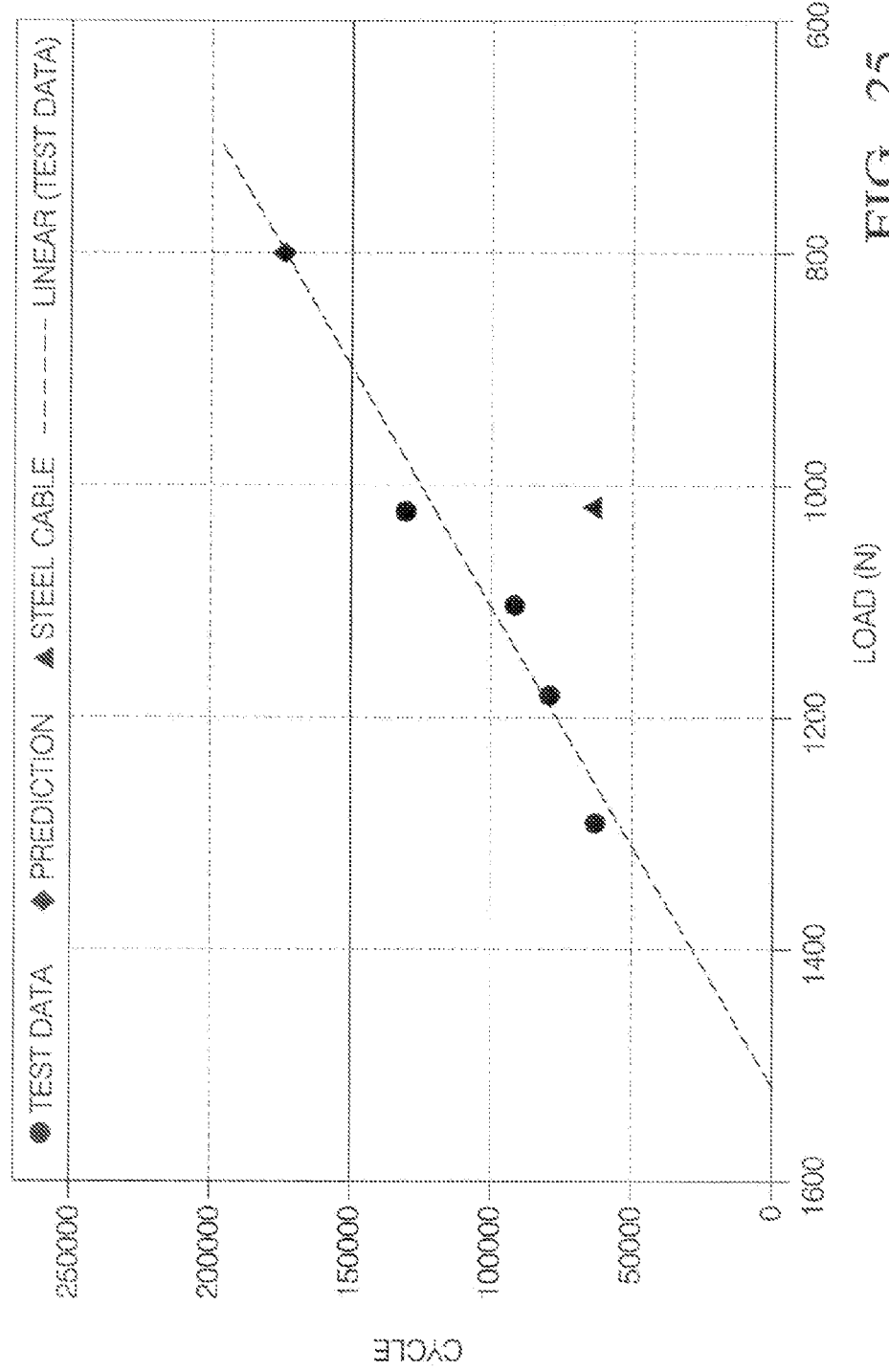

When one specific design was tested, the all-plastic cable demonstrated a significant increase in flexibility and strength over current metal cables. Results of this test are provided in FIGS. 24 and 25. In this particular test, the plastic cable was capable of 200% specification requests which represents a 40% increase over current metal cables. These results are merely illustrative of the increased flexibility and strength of the all-plastic cable over current metal cable, and improvements of this scale may not be reported in each instance where the metal cable is replaced with the all-plastic cable. Generally, however, due to the increased strength and flexibility of the all-plastic cable, it is usable with the smaller bending radius and therefore often meets packaging requirements more effectively than current metal cables.

Although it is not necessary, the outer sheath may also be applied, which is also a novel configuration of non-metallic materials. When working with a smaller bending radius by replacing the metal wire with the plastic inner core, the all-plastic cable can often perform at temperatures as low as −40° C. The metal cable with an all-plastic outer jacket generally fails at approximately −30° C. Also, the diameter of the cable may be enlarged or reduced at a lower cost by adjusting the diameter of the outer sheath by, a range of versatile applications is capable of being provided at a lower cost.

The cable or flexible connector of exemplary embodiments of the present invention may be used in the production of a driving system that moves one object into closer proximity to another object. The objects will have, or themselves be, points of connection for the driving cable which traverses the space between the objects. In automotive applications, the driving cable may serve to open and close windows, doors, and trunks and a variety of other applications.

In one exemplary embodiment it is contemplated that the cable will have an outside diameter of 3.20 mm and be able to withstand between 100,000-150,000 opening and closing cycles of a power sliding door 490 (FIG. 21) with a closing effort of 800 Newtons between the secondary and primary latching position of the door latching mechanism. Thus, exemplary embodiments provide a flexible connector that is capable of a useful life comprising 100,000-150,000 cycles experiencing a force in excess of 800 Newtons. It is, of course, understood that the aforementioned values are provided as non-limiting examples.

Moreover, and in any of the aforementioned embodiments, the exterior surface of the flexible connectors that makes contact with other functional surfaces (e.g., a surface of the pulley or cable drum) as the flexible connector provides a means for moving an item will provide reduced noise and vibrations as opposed to those provided by steel or metal cable alternatives. This is due in part to the characteristics of the LCP fibers and the lubricants disposed on the exterior surface of the flexible connector. In addition, and in some of the exemplary embodiments of the present invention, noise and vibrations are also reduced by the characteristics of the LCP fibers comprising the contact surfaces between the inner core member and the outer sheath as well as the lubricating materials disposed therebetween.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A flexible connector, comprising:
   an outer sheath defined by a plurality of strands of liquid crystal polymers each cooperating with each other to define and provide the outer sheath; and
   an inner axial opening disposed along an inner axis of the outer sheath;

an inner core member disposed within said inner axial opening, wherein an exterior surface of the outer sheath is coated with a lubricant and a portion of the outer sheath is manipulated into a protrusion providing a engagement surface for securement of an end-fitting member thereto to the outer sheath, the protrusion depending away from the exterior surface.

2. The flexible connector as in claim 1, wherein said inner core member is an extruded plastic member.

3. The flexible connector as in claim 1, wherein said inner core member is constructed from a plurality of uni-directed strands of liquid crystal polymers.

4. The flexible connector as in claim 1, wherein said inner core member is constructed from a plurality of braided strands of liquid crystal polymers.

5. The flexible connector as in claim 1, wherein said plurality of strands of liquid crystal polymers define said inner axial opening and the plurality of strands of the liquid crystal polymers are braided together.

6. The flexible connector as in claim 1, wherein said end-fitting member is over molded onto said engagement surface of the protrusion.

7. The flexible connector as in claim 6, wherein the protrusion is a knot formed by wrapping the outer sheath about itself.

8. The flexible connector as in claim 6, wherein a tail portion of the flexible connector defines the protrusion and said flexible connector is wrapped around said exterior surface of the outer sheath.

9. The flexible connector as in claim 6, wherein the flexible connector is capable of being disposed about a curved surface defined by a radius that is less than 25 millimeters.

10. The flexible connector as in claim 1, wherein the coefficient of friction between said exterior surface of the outer sheath and another surface is less than that of a steel cable and said another surface.

11. The flexible connector as in claim 1, wherein the flexible connector can be disposed about a curved surface defined by a radius that is less than 25 millimeters, wherein the exterior surface of the outer sheath contacts the curved surface and the flexible connector is capable of withstanding a tensile force greater than 800 Newtons.

12. The flexible connector as in claim 1, wherein the end-fitting member has an opening disposed therein and the opening extends past an end of the flexible connector, when the end-fitting member is secured to the flexible connector by engaging the protrusion.

13. The flexible connector as in claim 12, wherein the end-fitting member has a circular or rectangular outer configuration.

14. The flexible connector as in claim 1, wherein the coefficient of friction between the exterior surface of the outer sheath and another surface not integral with the flexible connector is less than that of a steel cable and the another surface.

15. The flexible connector as in claim 1, wherein the outer sheath comprises a plurality of strands of liquid crystal polymers and the protrusion is a knot defined by a portion of the outer sheath.

16. The flexible connector as in claim 1, wherein the outer sheath comprises a plurality of strands of liquid crystal polymers and the protrusion is a beaded member.

17. The flexible connector as in claim 1, wherein the outer sheath comprises a plurality of strands of liquid crystal polymers and wherein the lubricant is graphite and the end fitting is plastic and the end fitting is over molded onto the beaded member.

* * * * *